(12) United States Patent
Yamada et al.

(10) Patent No.: US 12,120,448 B2
(45) Date of Patent: Oct. 15, 2024

(54) IMAGING DEVICE

(71) Applicant: Panasonic Intellectual Property Management Co., Ltd., Osaka (JP)

(72) Inventors: Shota Yamada, Shiga (JP); Motonori Ishii, Osaka (JP); Shigetaka Kasuga, Osaka (JP); Masato Takemoto, Osaka (JP); Yutaka Hirose, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 227 days.

(21) Appl. No.: 17/683,465

(22) Filed: Mar. 1, 2022

(65) Prior Publication Data
US 2022/0191424 A1    Jun. 16, 2022

Related U.S. Application Data

(63) Continuation of application No. PCT/JP2020/029235, filed on Jul. 30, 2020.

(30) Foreign Application Priority Data

Sep. 6, 2019  (JP) .................... 2019-163238

(51) Int. Cl.
*H04N 25/778*    (2023.01)
*H04N 25/60*    (2023.01)
*H04N 25/772*    (2023.01)

(52) U.S. Cl.
CPC ........... *H04N 25/778* (2023.01); *H04N 25/60* (2023.01); *H04N 25/772* (2023.01)

(58) Field of Classification Search
None
See application file for complete search history.

(56) References Cited

U.S. PATENT DOCUMENTS

2015/0115131 A1* 4/2015 Webster ............... H04N 25/772
250/208.1
2015/0281620 A1* 10/2015 Usuda ............... H01L 27/14609
257/438

(Continued)

FOREIGN PATENT DOCUMENTS

JP    2004-144734 A    5/2004
JP    2016-058763 A    4/2016

(Continued)

OTHER PUBLICATIONS

International Search Report issued in corresponding International Publication No. PCT/JP2020/029235, dated Oct. 13, 2020 w/English Translation.

*Primary Examiner* — Mark T Monk
(74) *Attorney, Agent, or Firm* — Rimon P.C.

(57) ABSTRACT

An imaging device includes: a solid-state imaging element having a plurality of pixel cells arranged in a matrix; and a signal processing part configured to process a detection signal outputted from each of the pixel cells. The pixel cells each include an avalanche photodiode and output a voltage corresponding to a count number of photons received by the avalanche photodiode as the detection signal. The signal processing part includes a variation calculation part configured to calculate a variation between the pixel cells in the detection signal outputted from each of the pixel cells, and a correction calculation part configured to correct the detection signal outputted from each of the pixel cells, on the basis of the variation calculated by the variation calculation part.

13 Claims, 19 Drawing Sheets

(56) References Cited

U.S. PATENT DOCUMENTS

| | | | |
|---|---|---|---|
| 2018/0084205 A1 | 3/2018 | Kitagawa | |
| 2018/0328783 A1* | 11/2018 | Nishihara | H04N 5/32 |
| 2020/0106982 A1 | 4/2020 | Kasuga et al. | |
| 2020/0374478 A1 | 11/2020 | Maruno et al. | |

FOREIGN PATENT DOCUMENTS

| | | |
|---|---|---|
| JP | 2018-091760 A | 6/2018 |
| WO | 2016/185700 A1 | 11/2016 |
| WO | 2018/216400 A1 | 11/2018 |
| WO | 2019/102637 A1 | 5/2019 |

\* cited by examiner

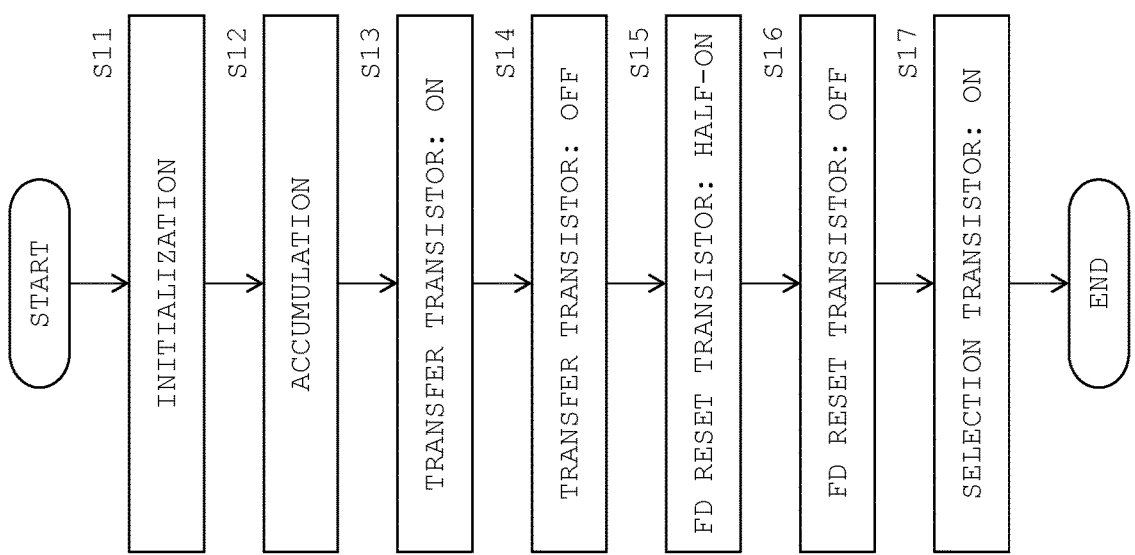
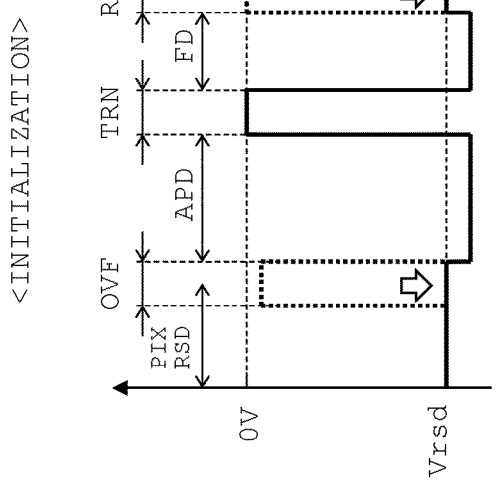
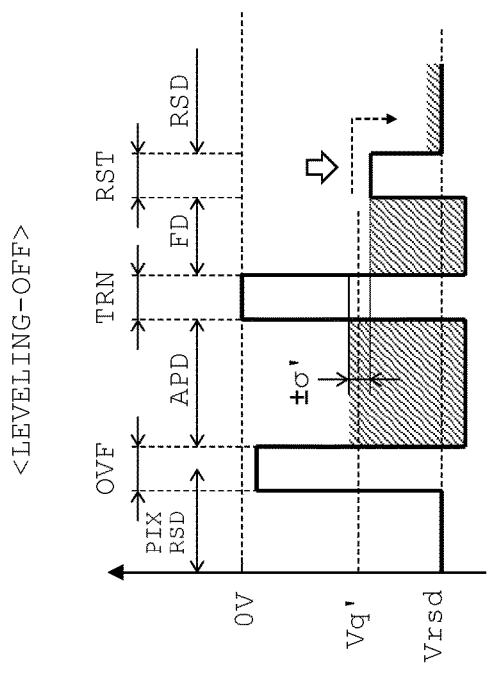

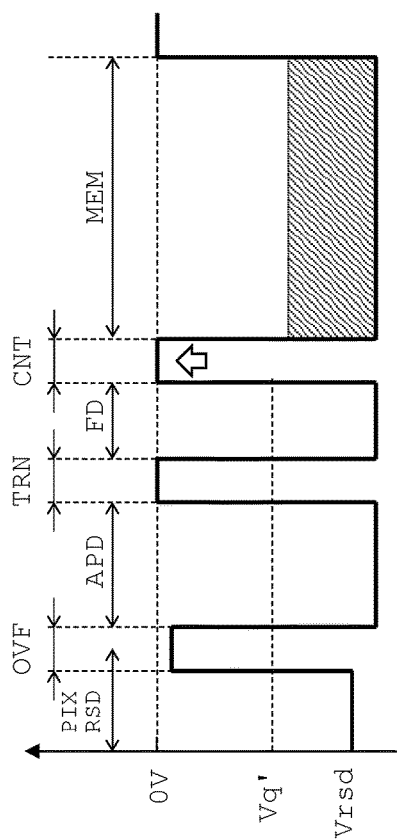
FIG. 13C <FINAL ACCUMULATION>
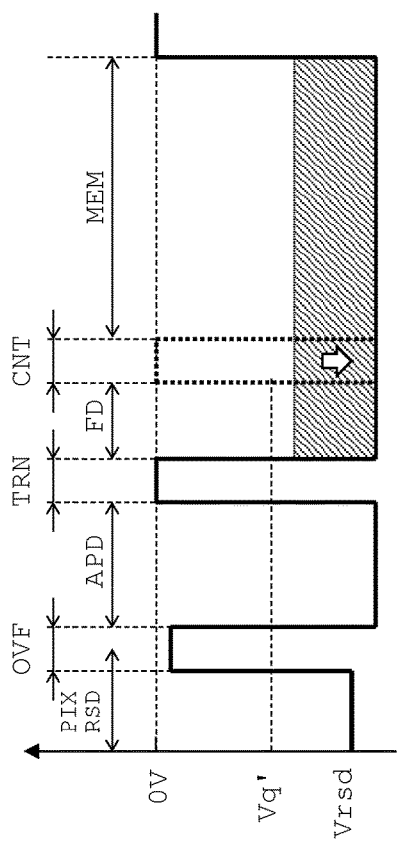
FIG. 13D <COUNT>
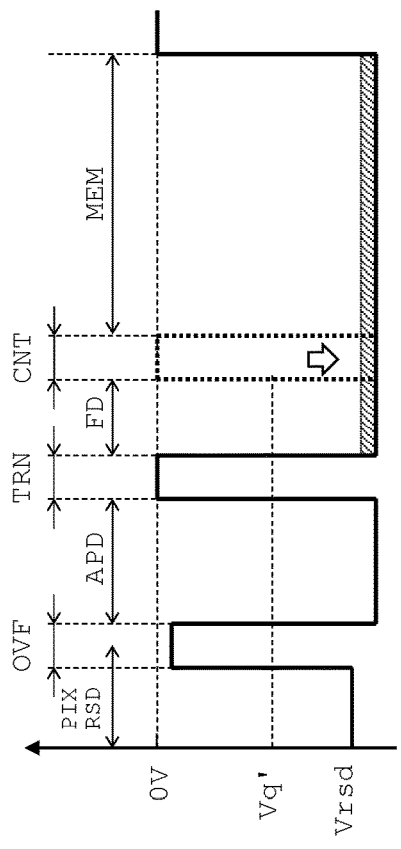
FIG. 13A <TRANSFER>
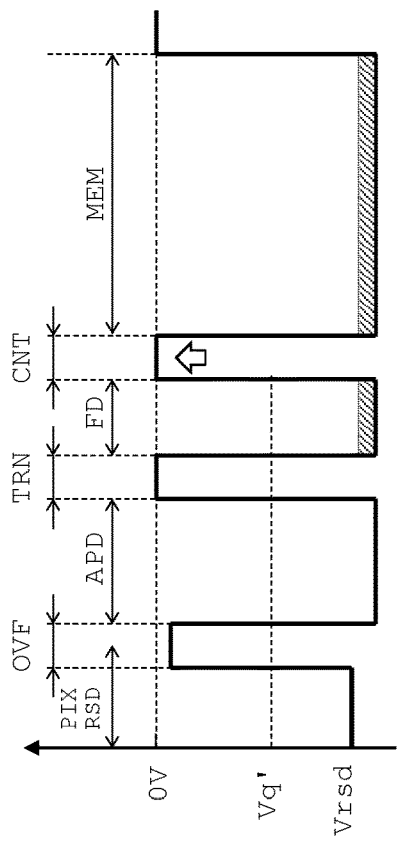
FIG. 13B <ACCUMULATION>

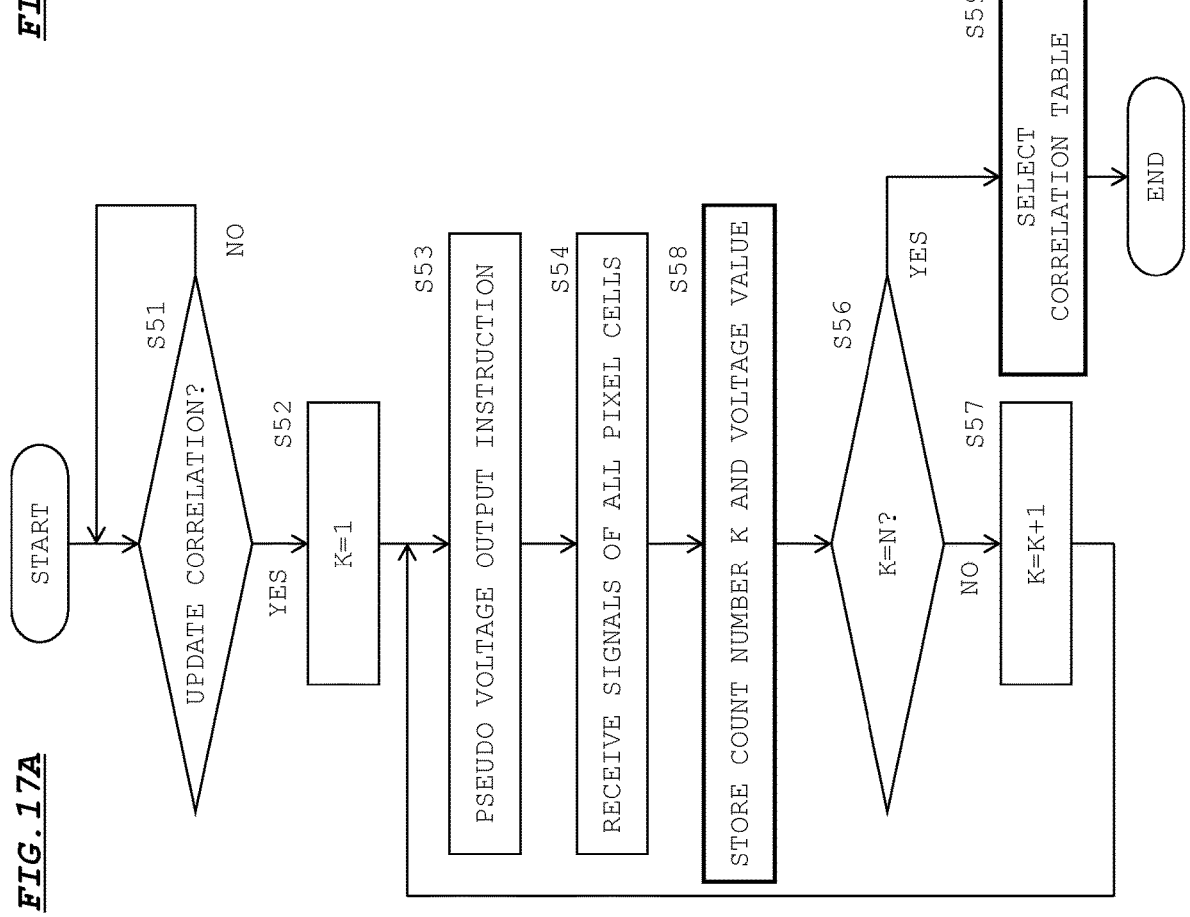

IMAGING DEVICE

CROSS REFERENCE TO RELATED APPLICATION

This application is a continuation of International Application No. PCT/JP2020/029235 filed on Jul. 30, 2020, entitled "IMAGING DEVICE", which claims priority under 35 U.S.C. Section 119 of Japanese Patent Application No. 2019-163238 filed on Sep. 6, 2019, entitled "IMAGING DEVICE". The disclosures of the above applications are incorporated herein by reference.

BACKGROUND OF THE INVENTION

1. Field of the Invention

The present invention relates to an imaging device in which a solid-state imaging element is used.

2. Disclosure of Related Art

To date, an imaging device in which a solid-state imaging element is used has been used in various fields such as medical treatment and radiation measurement. Recently, such an imaging device has also been used in an object detection device that projects light to a target region and detects the presence or absence of an object in the target region on the basis of the presence or absence of reflected light of the projected light. In this case, the distance to the object is measured on the basis of the time difference between the timing of projecting light with respect to the target region and the timing of receiving reflected light. The presence or absence of reflected light is detected at each pixel of the solid-state imaging element, and the distance to the object is measured. By mapping the measured distance to each pixel position, a distance image with respect to the target region can be generated.

In a device that requires detection of weak light, a solid-state imaging element having avalanche photodiodes (hereinafter referred to as "APDs") arranged in an array can be used. For example, in the above object detection device, the intensity of the reflected light is inversely proportional to the square of the distance to the object, so that the intensity of the reflected light received by the solid-state imaging element is considerably decreased as the distance measurement range becomes longer. In such a case, it is advantageous to use a solid-state imaging element having APDs arranged in an array. Each APD amplifies electrons (electric charges) generated by collision of photons, by avalanche multiplication. Accordingly, it is possible to detect weak light. In this type of solid-state imaging element, an APD and a processing circuit therefor are arranged in each pixel cell.

Here, the imaging device in which a solid-state imaging element is used has a problem that noise is generated in a signal from each pixel cell. As an example of a method for reducing such noise, Japanese Laid-Open Patent Publication No. 2016-58763 describes a signal processing device that includes: a first connection control part which controls connection between a floating diffusion of a unit pixel and a signal line for transferring a signal read from the unit pixel; a second connection control part which controls connection between an input of a feedback amplification part and the signal line; a third connection control part which controls connection between an output of the feedback amplification part and the signal line; and a feedback control part which controls the unit pixel, the feedback amplification part, and the first connection control part to the third connection control part and which feeds back the output of the feedback amplification part to the floating diffusion.

In the configuration of Japanese Laid-Open Patent Publication No. 2016-58763, a configuration for feeding back the output of the amplification part to the floating diffusion is required for each pixel, so that the configuration of a solid-state imaging element is complicated.

SUMMARY OF THE INVENTION

A first aspect of the present invention is directed to an imaging device. The imaging device according to this aspect includes: a solid-state imaging element having a plurality of pixel cells arranged in a matrix; and a signal processing part configured to process a detection signal outputted from each of the pixel cells. Here, the pixel cells each include an avalanche photodiode and output a voltage corresponding to a count number of photons received by the avalanche photodiode as the detection signal. The signal processing part includes a variation calculation part configured to calculate a variation between the pixel cells in the detection signal outputted from each of the pixel cells, and a correction calculation part configured to correct the detection signal outputted from each of the pixel cells, on the basis of the variation calculated by the variation calculation part.

In the imaging device according to the first aspect, in the signal processing part which processes the detection signal outputted from each pixel cell, the variation of the detection signal outputted from each pixel cell is calculated, and the detection signal outputted from each pixel cell is corrected on the basis of the calculated variation. Therefore, the variation of the detection signal from each pixel cell can be corrected.

A second aspect of the present invention is directed to an imaging device. The imaging device according to this aspect includes: a solid-state imaging element having a plurality of pixel cells arranged in a matrix; and a signal processing part configured to process a detection signal outputted from each of the pixel cells. Here, the pixel cells each include an avalanche photodiode and output a voltage corresponding to a count number of photons received by the avalanche photodiode as the detection signal. The signal processing part includes a correlation extraction part configured to extract a correlation between the count number and the detection signal for each of the pixel cells, and a count number acquisition part configured to acquire the count number corresponding to the detection signal from each of the pixel cells on the basis of the correlation extracted by the correlation extraction part.

In the imaging device according to the second aspect, the correlation between the count number of photons received by the avalanche photodiode and the detection signal of the pixel cell is extracted by the correlation extraction part in advance, and at the time of normal operation, the count number corresponding to the detection signal from each pixel cell is acquired on the basis of the correlation. Therefore, even when a variation occurs in the detection signal from each pixel cell, the photon count number can be properly acquired.

BRIEF DESCRIPTION OF THE DRAWINGS

FIG. 4A is a diagram illustrating the operation sequence of the pixel cell according to Embodiment 1;

FIG. 4B is a diagram illustrating another method for setting a leveling-off level for adjusting the amount of electric charges accumulated in a floating diffusion part to a predetermined level, according to Embodiment 1;

FIG. 4C is a flowchart for executing the operation sequence of the pixel cell according to Embodiment 1;

FIG. 13A to FIG. 13D are each a diagram illustrating the operation sequence of the pixel cell according to Embodiment 2;

FIG. 17A is a flowchart showing a process executed by a signal processing part at the time of operation of updating a correlation according to Modification 1 of Embodiment 2;

FIG. 17B is a diagram showing information stored in a correlation storage part by the process of FIG. 17A, according to Modification 1 of Embodiment 2;

It should be noted that the drawings are solely for description and do not limit the scope of the present invention by any degree.

DESCRIPTION OF PREFERRED EMBODIMENTS

Hereinafter, embodiments of the present invention will be described with reference to the drawings. In each embodiment, a configuration example in the case where an imaging device is mounted on a distance measurement device for measuring the distance to an object is shown.

Embodiment 1

Figure 1:
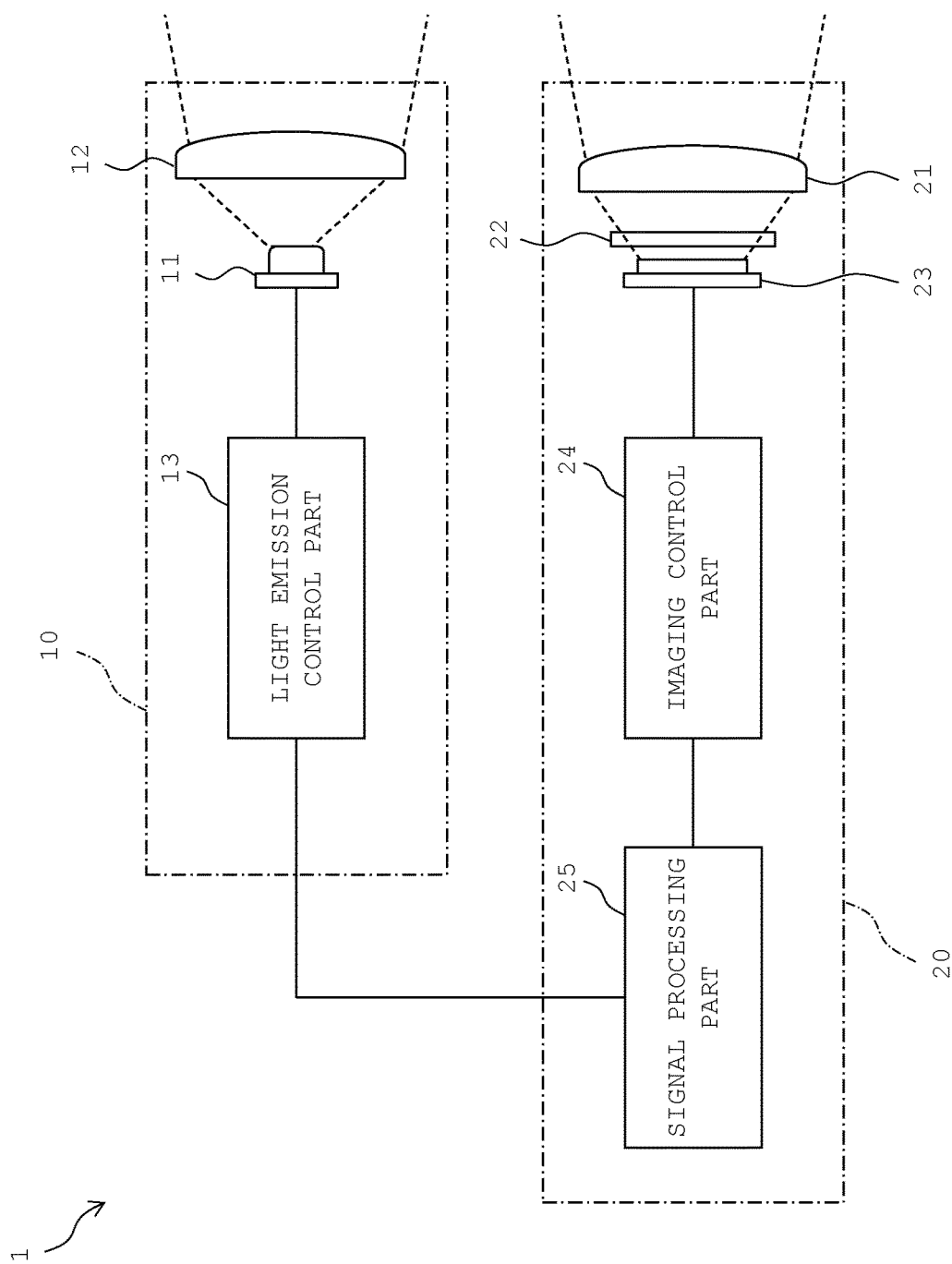
FIG. 1 is a diagram showing a configuration of a distance measurement device according to Embodiment 1.

FIG. 1 is a diagram showing a configuration of a distance measurement device 1 according to Embodiment 1.

The distance measurement device 1 includes a light projecting device 10 and an imaging device 20. The light projecting device 10 projects light to a target region. The imaging device 20 receives reflected light obtained by reflecting the light emitted from the light projecting device 10 on an object in the target region.

The light projecting device 10 includes a light source 11, a projection optical system 12, and a light emission control part 13. The light source 11 is composed of a laser light source, a light emitting diode (LED), or the like, and emits light having a predetermined wavelength. The projection optical system 12 projects the light emitted from the light source 11 to the target region at a predetermined spread angle. The projection optical system 12 includes a single lens or a plurality of lenses. The projection optical system 12 may include a concave mirror or the like. The light emission control part 13 causes the light source 11 to emit light in a pulsed manner on the basis of control by a signal processing part 25.

The imaging device 20 includes a light-receiving optical system 21, a filter 22, a solid-state imaging element 23, an imaging control part 24, and the signal processing part 25. The light-receiving optical system 21 forms an image of the reflected light obtained by reflecting the light emitted from the light projecting device 10 on an object in the target region, on a light-receiving surface of the solid-state imaging element 23. The light-receiving optical system 21 includes a single lens or a plurality of lenses. The light-receiving optical system 21 may include a concave mirror or the like. The filter 22 allows the light emitted from the light source 11 to pass therethrough and removes light having other wavelengths.

The solid-state imaging element 23 has a configuration in which a plurality of pixel cells are arranged in a matrix. That is, a plurality of pixel cells are arranged in the solid-state imaging element 23 so as to be adjacently aligned in a straight line in each of a row direction and a column direction. In the solid-state imaging element 23, an APD and a processing circuit therefor are mounted in each pixel cell.

The imaging control part 24 drives each pixel cell on the basis of control by the signal processing part 25. The signal processing part 25 controls the light emission control part 13 and the imaging control part 24 to measure the distance to an object existing in the target region. That is, the signal processing part 25 causes the light source 11 to emit light in a pulsed manner, via the light emission control part 13, and causes the solid-state imaging element 23 to receive reflected light based on this pulsed light emission, via the imaging control part 24. Then, the signal processing part 25 measures the distance to an object existing at a position, on the target region, corresponding to each pixel cell on the basis of the time difference between the timing of pulsed light emission and the timing of receiving the reflected light at each pixel cell.

In the configuration of FIG. 1, the solid-state imaging element 23 outputs a reflected light detection signal of each pixel cell to the imaging control part 24. When each pixel cell receives the reflected light, the pixel cell outputs a detection signal having a voltage level based on avalanche multiplication to the imaging control part 24. The amount of the reflected light incident on each pixel cell is decreased in inverse proportion to the square of the distance to the object. In addition, the amount of the reflected light incident on each pixel cell also changes depending on the reflectance of the object. Even if the amount of the reflected light changes as described above, each pixel cell outputs a detection signal having a predetermined voltage level based on avalanche multiplication to the imaging control part 24.

Specifically, when photons are incident on the APD arranged in each pixel cell, the APD amplifies electrons (electric charges) generated by collision of the photons to a saturated electric charge amount by avalanche multiplication. Each cell converts the saturated electric charge amount to a voltage, and outputs the voltage obtained as a result of the conversion, as a detection signal. Accordingly, the detection signal outputted from each cell is made uniform as the voltage corresponding to the saturated electric charge amount. As described above, each pixel cell outputs a detection signal having a constant voltage level to the imaging control part 24 regardless of the amount of the received reflected light.

However, in each pixel cell, due to various factors, electric charges whose amount is different from the normal saturated electric charge amount by avalanche multiplication may be generated. Therefore, the detection signal outputted from each pixel cell may vary with respect to the voltage corresponding to the saturated electric charge amount. If the detection signal varies for each pixel cell as described above, the processing of a circuitry subsequent to the imaging control part 24 may become unstable. It is preferable that the variation of the detection signal of each pixel cell is suppressed as much as possible.

Therefore, in Embodiment 1, a configuration for suppressing the variation of the detection signal of each pixel cell is used. Hereinafter, this configuration will be described.

First, a configuration of a pixel cell 100 will be described with reference to FIG. 2.

The pixel cell 100 includes an APD 101, an APD reset transistor 102, a transfer transistor 103, an FD reset transistor 104, an amplification transistor 105, and a selection transistor 106.

The APD 101 is an avalanche photodiode that amplifies electrons (electric charges) generated by collision of photons to a saturated electric charge amount by avalanche multiplication. The APD 101 is used in a Geiger amplification mode. A reverse bias voltage VSUB (for example, 25 V) corresponding to the Geiger amplification mode is applied to the anode of the APD 101. When photons are incident on the APD 101, electrons (electric charges) are accumulated in the cathode of the APD 101.

The APD reset transistor 102 is a transistor for resetting the electric charges accumulated in the cathode of the APD 101. By applying a reset signal OVF to the gate of the APD reset transistor 102, the electric charges accumulated in the cathode of the APD 101 are discharged to a reset drain power source PIXRSD via the APD reset transistor 102. Accordingly, the electric charges accumulated in the cathode of the APD 101 are reset.

The transfer transistor 103 is a transistor for transferring the electric charges accumulated in the cathode of the APD 101 to a floating diffusion part 110. By applying a transfer signal TRN to the gate of the transfer transistor 103, the electric charges accumulated in the cathode of the APD 101 are transferred to the floating diffusion part 110 via the transfer transistor 103.

The FD reset transistor 104 is a transistor for resetting the electric charges accumulated in the floating diffusion part 110. By applying a reset signal RST to the gate of the FD reset transistor 104, the electric charges accumulated in the floating diffusion part 110 are discharged to a reset drain power source RSD via the FD reset transistor 104. Accordingly, the electric charges accumulated in the floating diffusion part 110 are reset.

The amplification transistor 105 is a transistor for converting the amount of the electric charges accumulated in the floating diffusion part 110 into a voltage on the basis of a constant voltage VDD applied to the drain thereof. The selection transistor 106 is a transistor for outputting the voltage obtained as a result of the conversion by the amplification transistor 105 to a vertical signal line Vsig. By applying a selection signal SEL to the gate of the selection transistor 106, the voltage obtained as a result of the conversion by the amplification transistor 105 is outputted to the vertical signal line Vsig. The voltage outputted to the vertical signal line Vsig is outputted as a detection signal of the pixel cell 100 to the imaging control part 24 in FIG. 1.

In Embodiment 1, the capacity of the floating diffusion part 110 is set to be about half the capacity of an electric charge accumulation region of the cathode of the APD 101. However, the method for setting the capacity of the floating diffusion part 110 is not limited thereto, and various setting methods may be applied.

FIG. 3A to FIG. 3D are each a diagram illustrating an operation sequence of the pixel cell 100.

Figure 2:
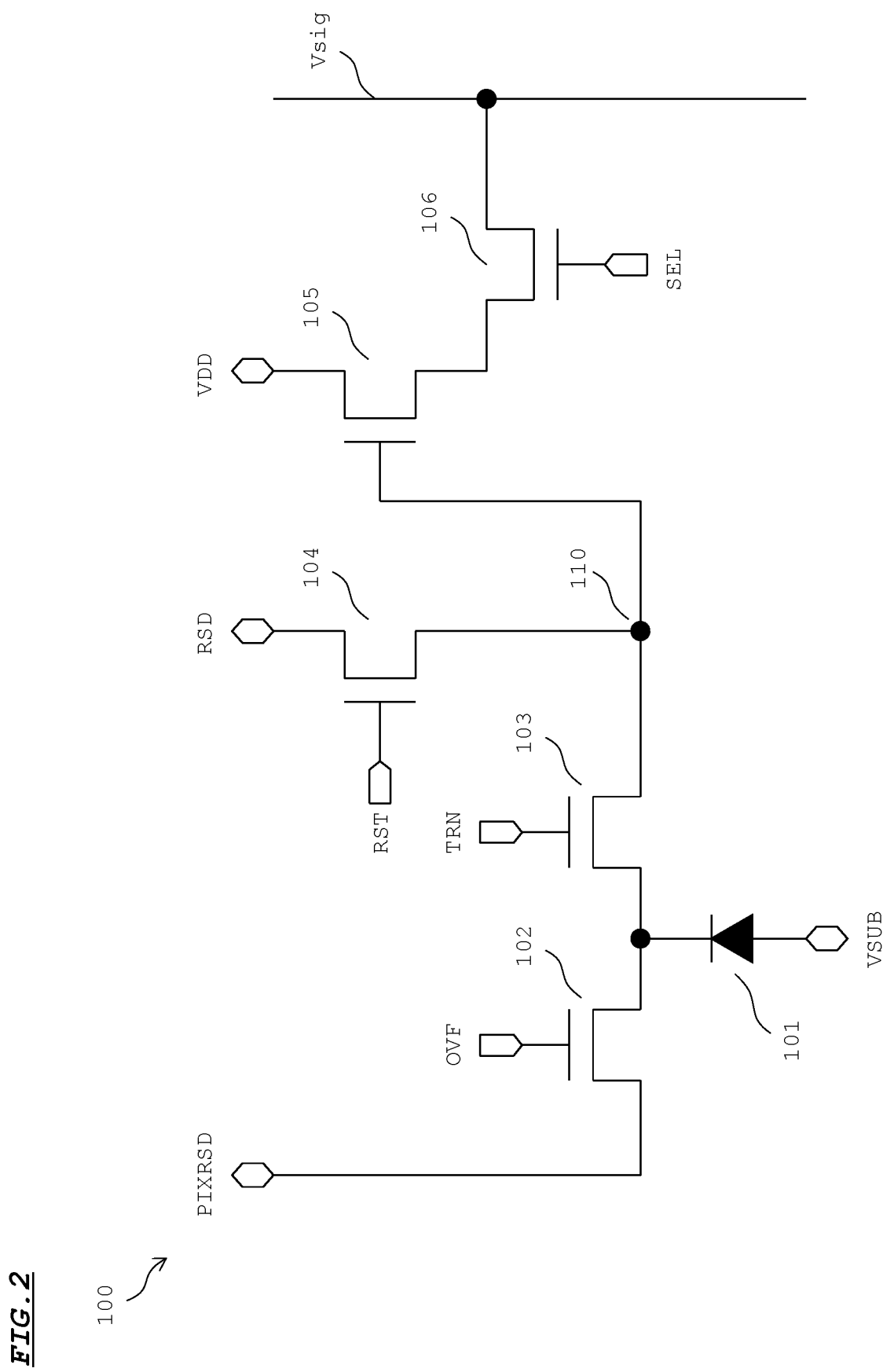
FIG. 2 is a diagram showing a configuration of a pixel cell according to Embodiment 1.

FIG. 3A to FIG. 3D each show a potential diagram of a circuitry from the reset drain power source PIXRSD in FIG. 2 through the APD reset transistor 102, the transfer transistor 103, the floating diffusion part 110, and the FD reset transistor 104 to the reset drain power source RSD. On the vertical axis, the direction of an arrow is the direction of low potential.

In FIG. 3A to FIG. 3D, "PIXRSD" indicates the potential of the reset drain power source PIXRSD, "APD" indicates the potential of the cathode of the APD 101, "FD" indicates the potential of the floating diffusion part 110, and "RSD" indicates the potential of the reset drain power source RSD. In addition, "OVF" indicates the potential of the APD reset transistor 102, "TRN" indicates the potential of the transfer transistor 103, and "RST" indicates the potential of the FD reset transistor 104.

Figure 3A:
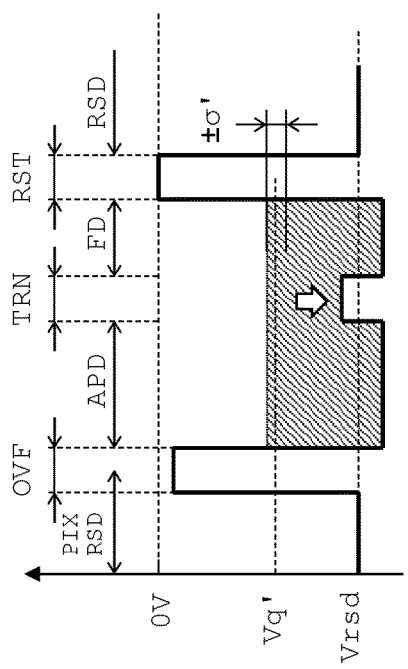
FIG. 3A to FIG. 3D are each a diagram illustrating an operation sequence of the pixel cell according to Embodiment 1.

The initial state of FIG. 3A shows a state after the cathode of the APD 101 and the floating diffusion part 110 are reset. In the initial state, the PIXRSD and the RSD are set to a potential Vrsd.

Also, in this initial state, the imaging control part 24 drives the APD reset transistor 102 with a low voltage, thereby generating a potential barrier at the OVF. Further-more, the imaging control part 24 sets the transfer transistor 103 and the FD reset transistor 104 to be OFF, thereby generating a potential barrier having a height of potential of OV at the TRN and the RST.

From this state, the imaging control part 24 performs exposure to each pixel cell 100 for a predetermined time in accordance with the pulsed light emission of the light source 11. Accordingly, when the reflected light is incident on the APD 101, electric charges (electrons) are accumulated in the cathode of APD 101, and the potential of the APD changes as shown in FIG. 3B. In FIG. 3B, the accumulation of the electric charges is shown by hatching. When electric charges whose amount is equal to the normal saturated electric charge amount are generated by avalanche multiplication, the potential of the APD becomes a potential Vq (hereinafter, referred to as "quenching potential Vq").

The saturated electric charge amount can vary for each APD 101. Therefore, the quenching potential Vq can also vary in the range of dispersion ±σ for each APD 101. FIG. 3B illustrates the case where, due to this variation, electric charges are generated in an electric charge amount slightly larger than a typical saturated electric charge amount. In addition, in FIG. 3B, a typical quenching potential is indicated as Vq. Hereinafter, the "quenching potential Vq" means a typical quenching potential unless otherwise specified.

When electric charges are generated in an electric charge amount exceeding the potential of the OVF, the excess electric charges move to the PIXRSD beyond the potential barrier of the OVF and are discharged to the reset drain power source PIXRSD.

When the electric charge accumulation in the cathode of the APD 101 ends as such, the imaging control part 24 sets the transfer transistor 103 to be ON. Accordingly, as shown in FIG. 3C, the potential barrier of the TRN falls, and the electric charges accumulated in the cathode of the APD 101 are distributed to the floating diffusion part 110 via the transfer transistor 103.

Figure 3C:
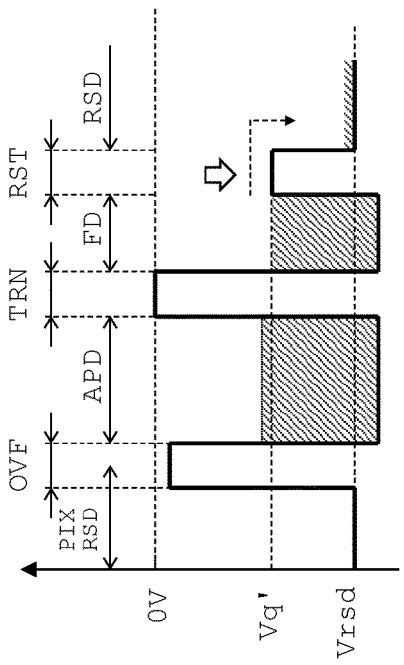
Figure 3B:
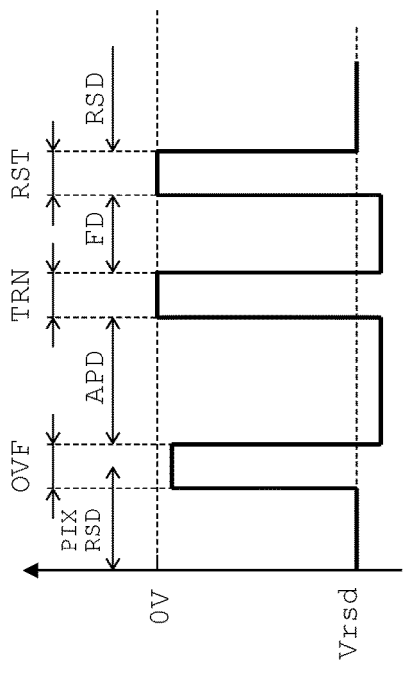

In FIG. 3C, a potential Vq' is a potential of electric charges distributed to the floating diffusion part 110 when electric charges (electric charges corresponding to the quenching potential Vq) whose amount is equal to the normal saturated electric charge amount are accumulated in the cathode of the APD 101 in an accumulation step of FIG. 3B. Hereinafter, this potential Vq' is referred to as a reference accumulation potential. Here, in the step of FIG. 3B, since the electric charges are accumulated in the cathode of the APD 101 in an electric charge amount exceeding the typical saturated electric charge amount, the amount of electric charges distributed to the floating diffusion part 110 is also an electric charge amount slightly exceeding the reference accumulation potential Vq' as shown in FIG. 3C. Depending on the variation of the saturated electric charge amount, the voltage corresponding to the amount of the electric charges accumulated in the step of FIG. 3C also varies in the range of dispersion ±σ' with respect to the typical reference accumulation potential Vq'. Hereinafter, the "reference accumulation potential Vq'" means a reference accumulation potential corresponding to the typical quenching potential Vq, unless otherwise specified.

Figure 3D:
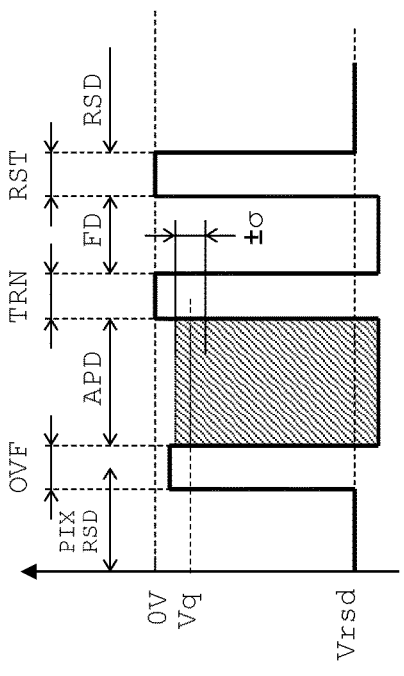

Thereafter, the imaging control part 24 switches the transfer transistor 103 to be OFF, and further sets the FD reset transistor 104 to be half-ON. Accordingly, as shown in FIG. 3D, the potential barrier of the TRN rises, and the potential barrier of the RST falls.

Here, the imaging control part 24 sets a voltage to be applied to the gate of the FD reset transistor 104, such that the potential barrier of the RST becomes the reference accumulation potential Vq'. Accordingly, as shown in FIG. 3D, of the electric charges distributed to the floating diffusion part 110, the excess electric charges exceeding the reference accumulation potential Vq' move to the RSD beyond the potential barrier of the RST. That is, the excess electric charges exceeding the reference accumulation potential Vq' are discharged to the reset drain power source RSD via the FD reset transistor 104. Accordingly, the electric charges accumulated in the floating diffusion part 110 are fixed to a constant amount (amount corresponding to the reference accumulation potential Vq').

Thereafter, the imaging control part 24 sets the FD reset transistor 104 to be OFF. Accordingly, the potential barrier of the RST rises, and the amount of the electric charges accumulated in the floating diffusion part 110 is determined to be a predetermined electric charge amount (here, the electric charge amount corresponding to the reference accumulation potential Vq'). Then, the imaging control part 24 sets the selection transistor 106 to be ON, and outputs a voltage signal corresponding to the amount of the electric charges accumulated in the floating diffusion part 110, to the vertical signal line Vsig. Accordingly, the output of the detection signal of the pixel cell 100 is completed.

After the detection signal is outputted as described above, the imaging control part 24 performs an initialization process of resetting the electric charges accumulated in the cathode of the APD 101 and the electric charges accumulated in the floating diffusion part 110. That is, the imaging control part 24 sets the APD reset transistor 102 and the FD reset transistor 104 to be ON.

Accordingly, as shown in FIG. 4A, the potential barriers of the OVF and the RST fall, and the electric charges accumulated in the cathode of the APD 101 and the electric charges accumulated in the floating diffusion part 110 are discharged to the reset drain power source PIXRSD and the reset drain power source RSD via the APD reset transistor 102 and the FD reset transistor 104, respectively. Thereafter, the imaging control part 24 repeatedly executes the process of FIG. 3A to FIG. 3D and FIG. 4A to continue the output of the detection signal of the pixel cell 100.

In a leveling-off step of FIG. 3D, the height of the potential barrier when the FD reset transistor 104 is set to be half-ON is set to the same potential as the reference accumulation potential Vq', but the height of the potential barrier at the time of half-ON is not limited thereto. For example, as shown in FIG. 4B, when a dispersion is denoted by σ, the range in which the potential of the electric charges distributed to the floating diffusion part 110 can vary with respect to the reference accumulation potential Vq' can be represented by Vq'±σ. The height of the potential barrier at the time of half-ON may be set to the maximum value including this dispersion, that is, the potential higher by +σ than the reference accumulation potential Vq'.

In this case, the amount of the electric charges remaining in the floating diffusion part 110 after the leveling-off step is smaller than that in the case of FIG. 3D. However, the amount of the electric charges remaining in the floating diffusion part 110 after the leveling-off step can be more reliably fixed to a constant amount. In addition, the height of the potential barrier when the FD reset transistor 104 is half-ON may be set so as to be slightly higher than the potential obtained by adding the variation to the reference accumulation potential Vq', or may be set to another potential within the range of the variation.

However, in order to more reliably fix the amount of the electric charges remaining in the floating diffusion part 110 after the leveling-off step to a constant amount, the height of the potential barrier when the FD reset transistor 104 is half-ON is preferably set so as to be equal to or higher than the reference accumulation potential Vq', and is further preferably set so as to be equal to or higher than the potential obtained by adding the variation to the reference accumulation potential Vq'.

FIG. 4C is a flowchart for executing the above process.

First, the imaging control part 24 executes initialization on the pixel cell 100 (S11). Accordingly, the potential of each part is set to that in the state of FIG. 4A, and the electric charges in the cathode of the APD 101 and the floating diffusion part 110 are reset. Next, after the potential of each part is set to that in the initial state of FIG. 3A, the imaging control part 24 performs exposure to accumulate electric charges in the cathode of the APD 101 (S12). In this step, if reflected light is not incident on the APD 101, electric charges are not accumulated in the cathode of the APD 101.

Thereafter, the imaging control part 24 sets the transfer transistor 103 to be ON (S13). Accordingly, as shown in FIG. 3C, the electric charges accumulated in the cathode of the APD 101 are distributed to the floating diffusion part 110. Then, the imaging control part 24 sets the transfer transistor 103 to be OFF (S14) and further sets the FD reset transistor 104 to be half-ON (S15). Accordingly, as shown in FIG. 3D, excess electric charges are discharged from the floating diffusion part 110 via the APD reset transistor 102 to the reset drain power source PIXRSD.

Thereafter, the imaging control part 24 sets the FD reset transistor 104 to be OFF (S16) and further sets the selection transistor 106 to be ON (S17). Accordingly, the voltage corresponding to the amount of the electric charges accumulated in the floating diffusion part 110 is outputted as a detection signal to the vertical signal line Vsig. Thus, one sequence for the pixel cell 100 ends.

Thereafter, the imaging control part 24 returns the process to step S11 and repeats the same process. When reflected light is incident on the APD 101 in each sequence, the voltage corresponding to the reference accumulation potential Vq' is outputted as a detection signal from the pixel cell 100 to the imaging control part 24. When reflected light is not incident on the APD 101, electric charges are not transferred from the cathode of the APD 101 to the floating diffusion part 110 in a transfer step of FIG. 3C. In this case, even if the electric charges due to noise or the like are accumulated in the cathode of the APD 101, the potential barrier of the transfer transistor 103 set in the transfer step prevents the electric charges from being distributed to the floating diffusion part 110.

In the leveling-off step of FIG. 3D, the potential barrier of the RST is caused to fall to the reference accumulation potential Vq' in a state where the potential barrier of the TRN is caused to rise. However, during the transfer step of FIG. 3C, the potential barrier of the RST may be caused to fall to the reference accumulation potential Vq', and the excess electric charges exceeding the reference accumulation potential Vq' may be leveled off. Accordingly, transfer of electric charges and leveling-off of electric charges can be performed simultaneously. In this case, the leveling-off step of FIG. 3D is omitted.

Alternatively, during the accumulation step of FIG. 3B, the potential barrier of the TRN and the potential barrier of the RST may be caused to fall to the levels in FIG. 3C and FIG. 3D, respectively. Accordingly, while electric charges are accumulated in the cathode of the APD 101, transfer of electric charges to the floating diffusion part 110 and leveling-off of the excess electric charges exceeding the reference accumulation potential Vq' can be performed simultaneously. In this case, the transfer step of FIG. 3C and the leveling-off step of FIG. 3D are omitted.

When the detection signal outputted to the vertical signal line Vsig is inputted to the imaging control part 24, the imaging control part 24 transmits the detection signal sequentially inputted from each pixel cell 100, to the signal processing part 25. The signal processing part 25 measures the distance to an object existing at a position corresponding to each pixel cell 100, on the basis of the time difference between the timing when the detection signal is received and the timing when the light source 11 is caused to emit the emission pulse. In this manner, the distance to the object existing in the target region is measured.

Here, even if the detection signal outputted from each pixel cell 100 to the imaging control part 24 is made uniform by the above leveling-off step, the detection signal may be varied due to the characteristics of the circuitry and the like. For example, in the leveling-off step of FIG. 3D, the level of the potential barrier of the RST may be slightly varied in each pixel cell 100 due to the electrical characteristics of the FD reset transistor 104 and the like.

In the present embodiment, the signal processing part 25 is further provided with a configuration for correcting such a variation of the detection signal in each pixel cell 100.

Figure 5:
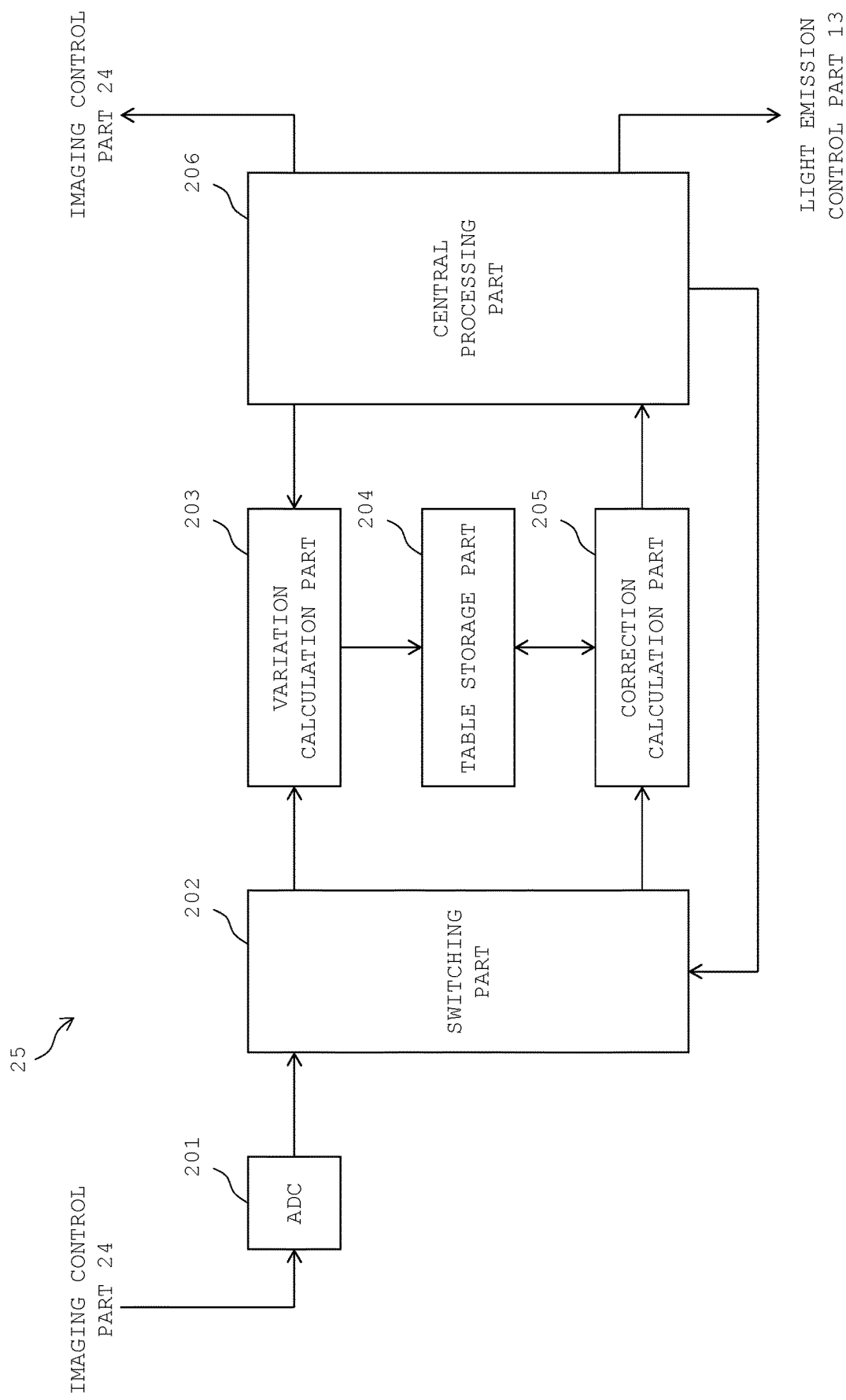
FIG. 5 is a diagram showing a configuration of a signal processing part according to Embodiment 1.

FIG. 5 is a diagram showing a configuration of the signal processing part 25.

The signal processing part 25 includes an ADC 201, a switching part 202, a variation calculation part 203, a table storage part 204, a correction calculation part 205, and a central processing part 206.

The ADC 201 converts the analog detection signal of each pixel cell 100 inputted from the imaging control part 24, into a digital signal. The switching part 202 outputs the digital detection signal inputted from the ADC 201, to either the variation calculation part 203 or the correction calculation part 205 on the basis of control by the central processing part 206.

The variation calculation part 203 calculates a variation of the detection signal from each pixel cell 100 on the basis of a detection signal for one screen inputted from the switching part 202 (detection signals from all the pixel cells 100). The table storage part 204 stores data indicating the variation of the detection signal in each pixel cell 100 calculated by the variation calculation part 203, in association with each pixel cell 100. Accordingly, the table storage part 204 forms a correction table in which the variation data is associated with each pixel cell 100.

The correction calculation part 205 corrects the detection signal of each pixel inputted from the switching part 202, on the basis of the correction table held in the table storage part 204, and outputs the corrected detection signal to the central processing part 206. The central processing part 206 controls each part according to a predetermined program. In addition, as described above, the central processing part 206 controls the light emission control part 13 and the imaging control part 24 to execute a process of measuring the distance to an object.

For example, the central processing part 206 sets n (for example, 20) sections associated with different distances. In each section, the central processing part 206 causes the light source 11 to emit light in a pulsed manner at the same timing from the start of the section. In addition, in each section, the central processing part 206 performs exposure on each pixel cell 100 for a certain period of time at the timing when the time length for the light to reciprocate for the distance associated with each section elapses from the timing of pulsed light emission. Accordingly, when an object exists at the position of the distance associated with a predetermined section among these sections, the pixel cell 100 receives reflected light from the object in this section, and the pixel cell 100 does not receive reflected light in the other sections. Therefore, by detecting in which section a detection signal is generated for each pixel cell 100, the distance to the object can be obtained for each pixel cell 100.

That is, the central processing part 206 compares the detection signal from each pixel cell 100 in all the n sections, and specifies the section in which the detection signal is generated, for each pixel cell 100. Then, the central processing part 206 acquires the distance associated with the specified section, as the distance to the object in the beam direction of reflected light incident on the pixel cell 100.

The distance measurement method is not limited to the above method, and may be another method using TOF (Time Of Flight).

The central processing part 206 may generate a distance image in which the distance acquired for each pixel cell 100 as described above is mapped to the position of each pixel cell 100, and may output this distance image to another processing device.

The configuration shown in FIG. 5 may be realized by a function of software, or may be realized by a combination of hardware. In the case where the configuration shown in FIG. 5 is realized by a function of software, each component of FIG. 5 is one shown as a function block for each function executed by the software. In addition, in the case where the configuration shown in FIG. 5 is realized by a function of hardware, each component of FIG. 5 corresponds to the configuration of each hardware. The configuration of FIG. 5 may be realized by a combination of a function by software and hardware.

At the time of normal operation, the central processing part 206 sets the switching part 202 to the correction calculation part 205 side. Accordingly, the detection signal inputted from the ADC 201 to the switching part 202 is inputted to the correction calculation part 205. In this case, the detection signal corrected by the correction calculation part 205 is inputted to the central processing part 206 and used for a distance measurement process.

At the time of operation of updating the correction table, the central processing part 206 sets the switching part 202 to the variation calculation part 203 side. Accordingly, the detection signal inputted from the ADC 201 to the switching part 202 is inputted to the variation calculation part 203. In this case, the variation data calculated by the variation calculation part 203 is associated with each pixel cell 100 and registered in the correction table. Accordingly, the correction table is updated.

Figure 6A:
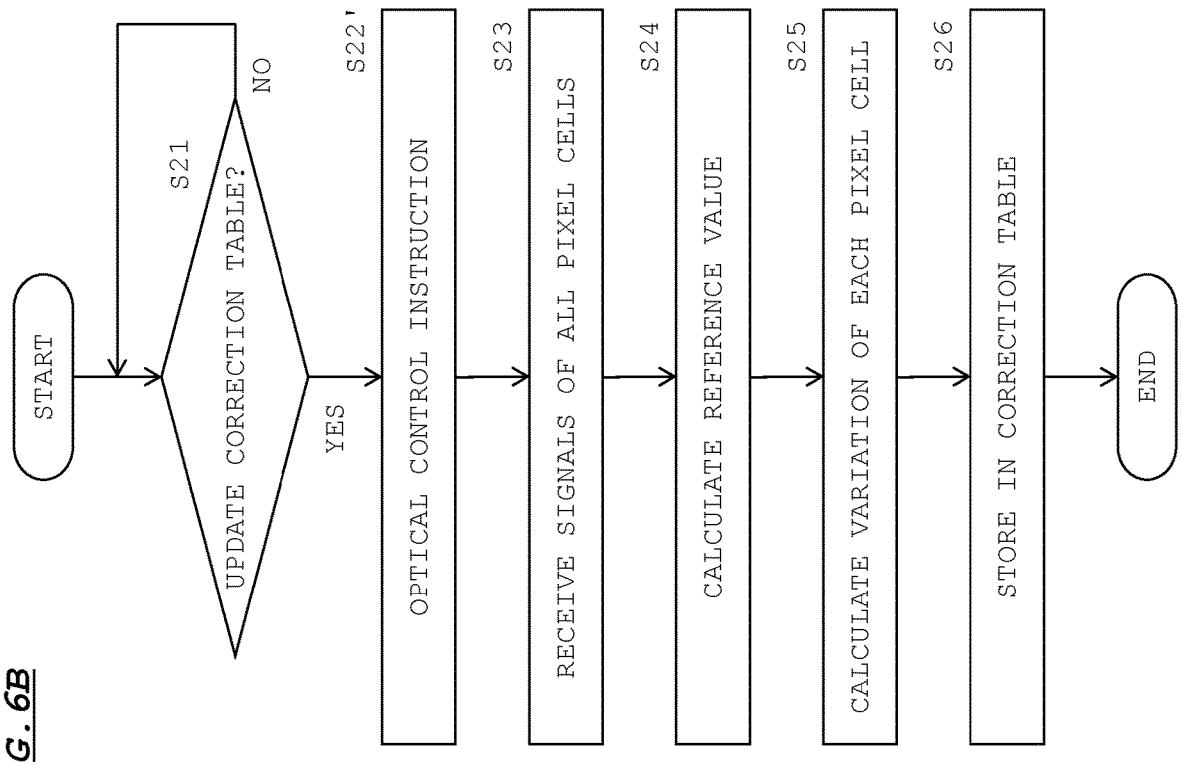
FIG. 6A is a flowchart showing a process executed by the signal processing part at the time of operation of updating a correction table, according to Embodiment 1.

FIG. 6A is a flowchart showing a process executed by the signal processing part 25 at the time of operation of updating the correction table.

First, the central processing part 206 determines whether or not an update condition for the correction table is satisfied (S21).

Figure 7:
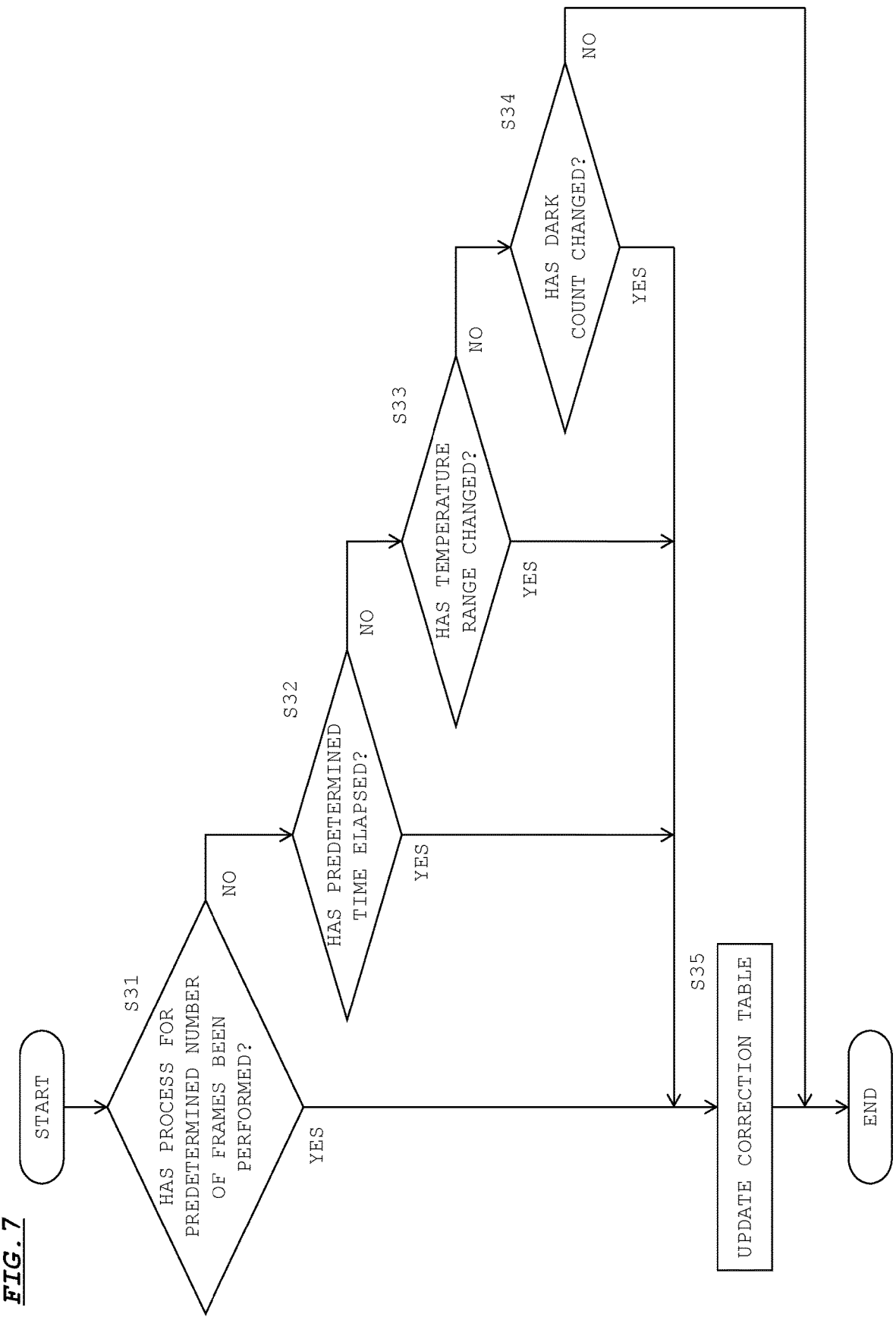
FIG. 7 is a flowchart for determining whether or not an update condition for the correction table is satisfied, according to Embodiment 1.

FIG. 7 is a flowchart for determining whether or not the update condition for the correction table is satisfied.

The central processing part 206 determines that the update condition for the correction table is satisfied (S35), when a process for a predetermined number of frames has been performed by normal operation from the last update (S31: YES), when a predetermined time has elapsed from the last update (S32: YES), when a temperature range in which the temperature of the solid-state imaging element 23 is included has changed from the temperature range at the time of the last update (S33: YES), or when a dark count rate (magnitude of a dark current) has deviated from a reference value range and a substrate voltage has been corrected (S34: YES).

In order to execute the process of step S32, the central processing part 206 has a clocking function. In addition, in order to execute the process of step S33, the central processing part 206 has a function of acquiring a detection signal from a temperature sensor for detecting the temperature of the solid-state imaging element 23. In this case, in addition to the configuration of FIG. 1, the imaging device 20 further includes a temperature sensor (not shown) for detecting the temperature of the solid-state imaging element 23.

FIG. 7 shows steps S31 to S34 as the update condition for the correction table, but the update condition is not necessarily limited to these conditions, and another condition may be added as long as the condition is a condition under which the degree of the variation of the detection signal outputted from each pixel cell 100 can be varied, or only one or two conditions out of steps S31 to S34 may be used. In addition, the predetermined number of frames and the predetermined time in step S31 and S32 are typically set assuming the change over time of the solid-state imaging element 23, but a plurality of predetermined numbers of frames or a relatively long time does not necessarily have to be set. For example, in order to more reliably correct the variation, the predetermined number of frames in step S31 may be one.

Referring back to FIG. 6A, when the update condition for the correction table is satisfied (S21: YES), the central processing part 206 transmits an electrical control instruction to the imaging control part 24 (S22). The electrical control instruction is an instruction to cause the same electric charges as when photons are incident on the APD 101 to be electrically accumulated in the floating diffusion part 110 and transmit a detection signal. When the leveling-off step of FIG. 3D is performed, electric charges corresponding to the reference accumulation potential Vq' are accumulated in the floating diffusion part 110 on the basis of the electrical control instruction.

Specifically, in accordance with reception of the electrical control instruction, the imaging control part 24 sets the reset drain power source PIXRSD shown in FIG. 2 to have a potential slightly higher than the potential corresponding to the saturated electric charge amount of the APD 101, and sets the APD reset transistor 102 to be ON. Accordingly, the same electric charges as in FIG. 3B are accumulated in the cathode of the APD 101. Thereafter, the imaging control part 24 executes the transfer step and the leveling-off step of FIG. 3C and FIG. 3D. Accordingly, the electric charges corresponding to the reference accumulation potential Vq' are accumulated in the floating diffusion part 110. Then, the imaging control part 24 executes a step of causing a voltage (detection signal) corresponding to the electric charges accumulated in the floating diffusion part 110 to be outputted to the vertical signal line Vsig. Accordingly, a detection signal of a potential equal to the reference accumulation potential Vq' is outputted to the imaging control part 24. The imaging control part 24 transfers the inputted detection signal to the signal processing part 25.

The control executed by the imaging control part 24 in accordance with reception of the electrical control instruction is not limited to the above control, and may be other control in which at least the variation of the detection signal outputted to the vertical signal line Vsig can be confirmed.

For example, in accordance with reception of the electrical control instruction, the imaging control part 24 may perform control of setting the reset drain power source RSD shown in FIG. 2 to have a potential slightly higher than the reference accumulation potential Vq' and setting the FD reset transistor 104 to be ON. Accordingly, electric charges whose amount is equal to an electric charge amount corresponding to the potential slightly higher than the reference accumulation potential Vq' are accumulated in the floating diffusion part 110. Thereafter, the imaging control part 24 executes the leveling-off step of FIG. 3D. Accordingly, the electric charges corresponding to the reference accumulation potential Vq' are accumulated in the floating diffusion part 110. Then, the imaging control part 24 executes a step of causing a voltage (detection signal) corresponding to the electric charges accumulated in the floating diffusion part 110 to be outputted to the vertical signal line Vsig. Accordingly, a detection signal of a potential equal to the reference accumulation potential Vq' is outputted to the imaging control part 24.

In accordance with reception of the electrical control instruction, the imaging control part 24 executes the above process in order on all the pixel cells 100. Accordingly, the detection signal from each pixel cell 100 is sequentially outputted from the imaging control part 24 to the signal processing part 25. At this time, the switching part 202 of FIG. 5 is set to the variation calculation part 203 side as described above. Therefore, the detection signal from each pixel cell 100 is sequentially outputted to the variation calculation part 203. In this manner, the variation calculation part 203 acquires the detection signals of all the pixel cells 100 (S23).

The variation calculation part 203 calculates a reference value V0 for the detection signals on the basis of the acquired detection signals of all the pixel cells 100 (S24).

Figure 8A:
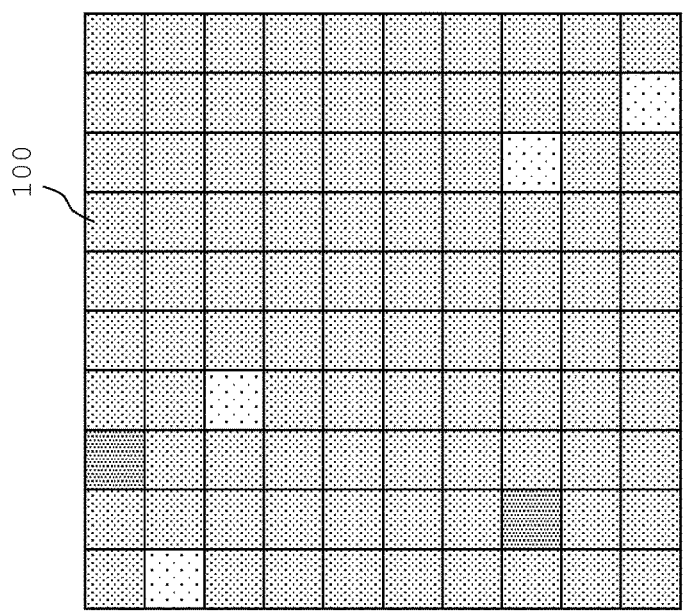
FIG. 8A is a diagram schematically showing a state of a detection signal acquired from each pixel cell, according to Embodiment 1.
Figure 8B:
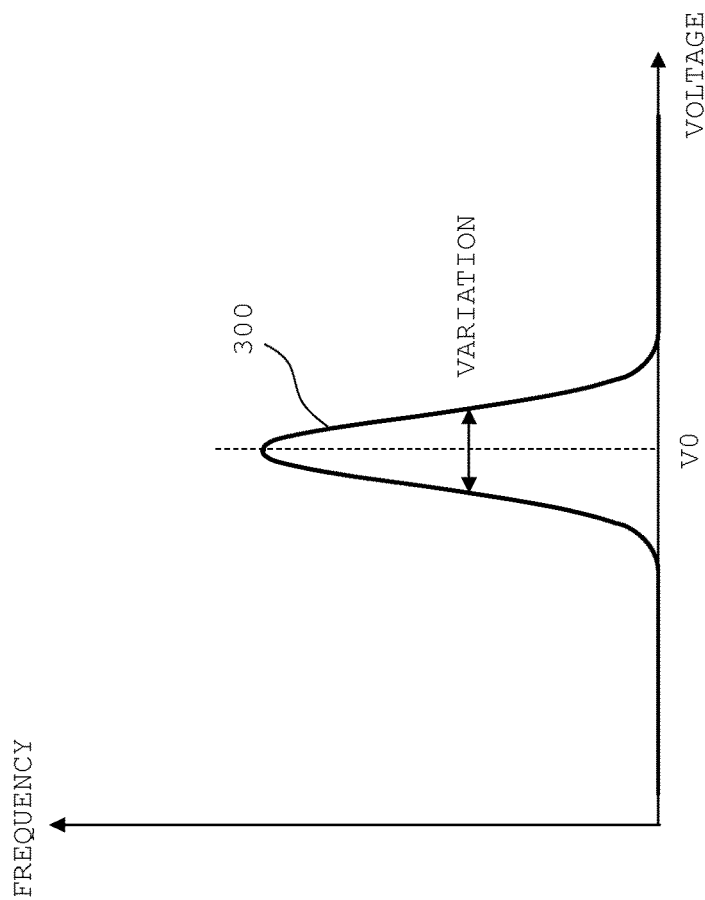
FIG. 8B is a diagram illustrating a method for calculating a reference value in a variation calculation part according to Embodiment 1.

FIG. 8A and FIG. 8B are each a diagram illustrating a method for calculating the reference value V0 in the variation calculation part 203.

FIG. 8A schematically shows the state of the detection signal acquired from each pixel cell 100. Here, the voltage level of the detection signal acquired from each pixel cell 100 is indicated by hatching added to each pixel cell 100. In FIG. 8A, for convenience, 10 pixel cells 100 are arranged in each of rows and columns. Here, the voltage levels of the detection signals are substantially the same except for several pixel cells 100. In the several pixel cells 100, the voltage levels of the detection signals are higher or lower than those in the other pixel cells 100 which are most of the pixel cells 100.

In step S24 of FIG. 6A, as shown in FIG. 8B, the variation calculation part 203 generates a histogram 300 on the basis of the detection signals acquired from all the pixel cells 100. The horizontal axis of FIG. 8B indicates the voltage value of the detection signal. The variation calculation part 203 acquires a mode, that is, a voltage value at which a frequency is maximum, from the generated histogram 300, and sets the acquired mode as the reference value V0.

The reference value V0 calculated in step S24 is not limited to the mode, and may be any other value as long as the value is a value that can index the overall tendency of the detection signals acquired from all the pixel cells 100. For example, the median value of the histogram 300 may be calculated as the reference value V0, or the average value of the detection signals acquired from all the pixel cells 100 may be calculated as the reference value V0.

Referring back to FIG. 6A, the variation calculation part 203 acquires the reference value V0 for determining a detection signal corresponding to a photon count number outputted from each of all the pixel cells 100, as described above, and calculates a variation of the detection signal of each pixel cell on the basis of the acquired reference value (S25). Specifically, the variation calculation part 203 calculates the difference between the reference value and the detection signal of each pixel cell 100, that is, a value obtained by subtracting the reference value from the detection signal, as the variation of the detection signal of each pixel cell 100. The variation calculation part 203 outputs the calculated variation to the table storage part 204. The table storage part 204 stores the inputted variation in the correction table in association with each pixel cell 100 (S26). Accordingly, the process of updating the correction table ends.

At the time of normal operation, the correction calculation part 205 adds the variation of each pixel cell 100 stored in the correction table to the detection signal of each pixel cell 100 inputted from the ADC 201 to the switching part 202, to correct the detection signal of each pixel cell 100. By this correction, when each pixel cell 100 receives reflected light, the detection signals from all the pixel cells 100 are made uniform in the correction calculation part 205 of the signal processing part 25. The correction calculation part 205 outputs the corrected detection signals to the central processing part 206. Thus, a distance measurement process is smoothly performed in the central processing part 206.

In the process of FIG. 6A, in step S22, electric charges are accumulated in the floating diffusion part 110 by electrical control. However, light from a standard light source (for which an incident photon number is known) may be caused to be incident on each pixel cell 100, and electric charges may be accumulated in the floating diffusion part 110.

Figure 6B:
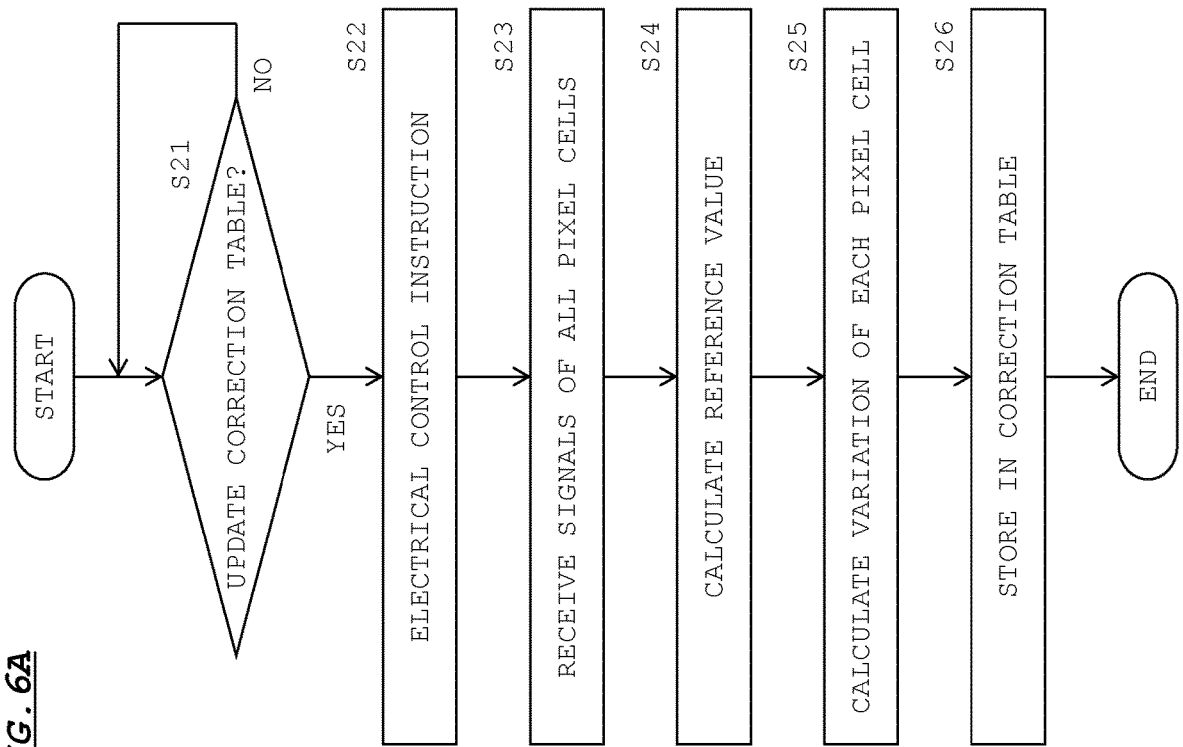
FIG. 6B is a flowchart showing a modification of the process executed by the signal processing part at the time of operation of updating the correction table, according to Embodiment 1.

In this case, the flowchart of FIG. 6A is changed as in FIG. 6B. In the flowchart of FIG. 6B, step S22 of FIG. 6A is replaced with step S22'. The steps other than step S22' are the same as those of FIG. 6A.

In step S22', the central processing part 206 transmits an optical control instruction to the light emission control part 13 and the imaging control part 24. In normal operation after the determination of step S21 becomes YES, the central processing part 206 monitors the detection signal from each pixel cell 100, and transmits the optical control instruction at the timing when reflected light has been received in all the pixel cells 100.

Upon receiving the optical control instruction, the light emission control part 13 causes the light source 11 to emit light with a predetermined intensity in a pulsed manner. At this time, the emission intensity may be the same as the emission intensity at the time of normal operation, or may be set so as to be higher than the emission intensity at the time of normal operation such that all the pixel cells 100 more reliably receive reflected light.

Upon receiving the optical control instruction, the imaging control part 24 causes exposure to be performed on all the pixel cells 100 for a predetermined time. Accordingly, electric charges are accumulated in the cathodes of the APDs 101 of all the pixel cells 100. Thereafter, the imaging control part 24 executes the process steps of FIG. 3A to FIG. 3D on all the pixel cells 100, and further causes all the pixel cells 100 to output a detection signal. Accordingly, the detection signals from all the pixel cells 100 are inputted to the signal processing part 25.

At this time, similar to the above, the switching part 202 of FIG. 5 is set to the variation calculation part 203 side. Accordingly, the detection signals from all the pixel cells 100 are inputted to the variation calculation part 203 (S23).

If the detection signal from any pixel cell 100 is at a voltage level when reflected light is not received, the process of step S22' may be executed again.

Hereinafter, the processes of steps S24 to S26 are executed in the same manner as in the flowchart of FIG. 6A. Accordingly, the correction table is updated. Thereafter, in normal operation, the correction calculation part 205 corrects the detection signal from each pixel cell 100 by using the updated correction table.

Since the variation of the detection signal from each pixel cell 100 is suppressed by performing the processes of FIG. 6A and FIG. 6B, the leveling-off step of FIG. 3D does not necessarily have to be performed. However, in the case where the leveling-off step of FIG. 3D is not performed, the variation of the detection signal from each pixel cell 100 inputted to the signal processing part 25 becomes larger. Therefore, it can be assumed that the difference between the reference value V0 and each detection signal tends to deviate from the true value. Therefore, in order to more accurately detect the difference and properly make the detection signals uniform, it is preferable that the uniforming processes of FIG. 6A and FIG. 6B are performed after the leveling-off step of FIG. 3D is performed.

Effects of Embodiment 1

According to Embodiment 1, the following effects can be achieved.

In the signal processing part 25 which processes the detection signal outputted from each pixel cell 100, the variation of the detection signal outputted from each pixel cell 100 is calculated, and the detection signal outputted from each pixel cell 100 is corrected on the basis of the calculated variation. Therefore, the variation of the detection signal from each pixel cell 100 can be corrected without providing a feedback circuit.

The variation calculation part 203 acquires the reference value V0 for determining detection signals corresponding to photon count numbers outputted from all the pixel cells 100, on the basis of the detection signals outputted from these pixel cells 100, and calculates a variation for each pixel cell 100 on the basis of the difference between the reference value V0 and the detection signal of each pixel cell 100. Accordingly, the variation of each detection signal can be calculated smoothly.

The signal processing part 25 includes the table storage part 204 which stores the difference between the reference value V0 and the detection signal for each pixel cell 100. Accordingly, the variation of each pixel cell 100 can be easily acquired from the correction table stored in the table storage part 204.

The correction calculation part 205 adds the difference to the detection signal for each pixel cell 100 to correct the detection signal. Accordingly, the detection signal from each pixel cell 100 can be smoothly made uniform.

In the flowchart of FIG. 6A, when electric charges are accumulated in a pseudo manner by electrical control on the plurality of pixel cells 100 (S22), the variation calculation part 203 calculates a variation on the basis of the detection signal outputted from each pixel cell 100. Accordingly, the variation of the detection signal from each pixel cell 100 can be smoothly calculated at any timing.

In the flowchart of FIG. 6B, when electric charges are accumulated in a pseudo manner by irradiating the plurality of pixel cells 100 with light (S22'), the variation calculation part 203 calculates a variation on the basis of the detection signal outputted from each pixel cell 100. By evaluating the detection signal outputted from each pixel cell 100 when light is actually applied as described, the variation of the detection signal can be accurately calculated.

As shown in FIG. 7, when a predetermined update condition is satisfied (S31 to S34), the variation calculation part 203 performs variation calculation and updates the variation in each pixel cell 100. By updating the detection result of the variation in accordance with occurrence of a change factor of the variation as described above, the detection signal from each pixel cell 100 can be more appropriately corrected.

Modification 1 of Embodiment 1

In Embodiment 1 described above, at the time of updating the correction table, variation calculation by the variation calculation part 203 is performed only once. On the other hand, in Modification 1, at the time of updating the correction table, variation calculation by the variation calculation part 203 is performed a plurality of times.

Figure 9:
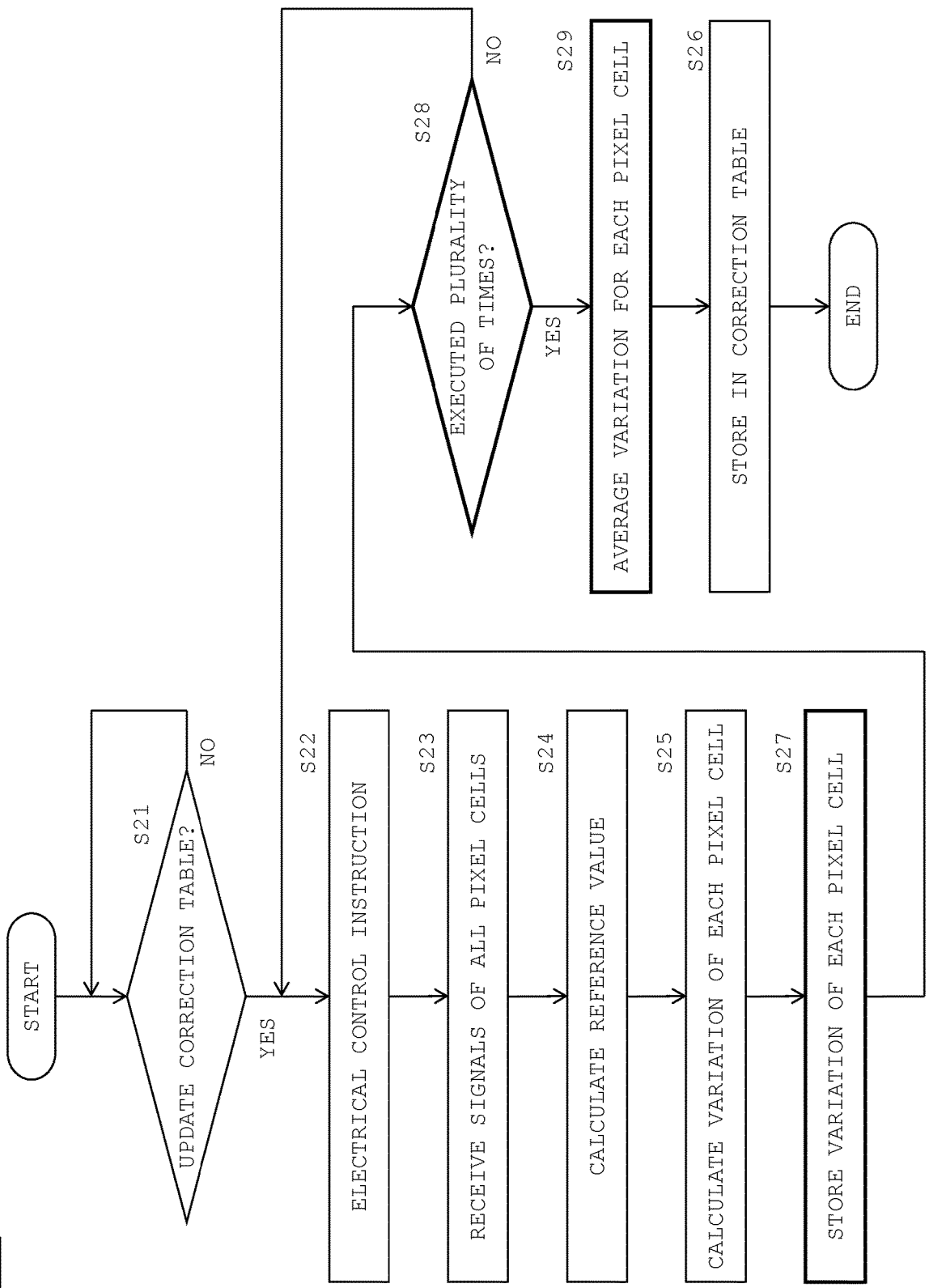
FIG. 9 is a flowchart showing a process executed by a signal processing part at the time of operation of updating a correction table, according to Modification 1.

FIG. 9 is a flowchart showing a process executed by the signal processing part 25 at the time of operation of updating the correction table according to Modification 1.

In the flowchart of FIG. 9, steps S27 to S29 are added as compared to the flowchart of FIG. 6A. The processes of the other steps are the same as those in FIG. 6A.

The table storage part 204 stores the variation of the detection signal from each pixel cell 100 calculated by the variation calculation part 203 in step S25 for each pixel cell 100 (S27). Thereafter, the central processing part 206 determines whether variation calculation and storage have been performed a predetermined plurality of times (for example, about 5 to 10 times) (S28). When this process has not been performed the plurality of times (S28: NO), the central processing part 206 returns the process to step S22. Accordingly, the variation at this time is stored in the table storage part 204 for each pixel cell 100.

When variation calculation and storage have been executed the predetermined plurality of times as described above (S28: YES), the table storage part 204 averages the variation stored in the process at each time, for each pixel cell 100 (S29), and stores the averaged value in the correction table in association with each pixel cell 100 (S26). Thus, the correction table is updated. Thereafter, in normal operation, the correction calculation part 205 corrects the detection signal from each pixel cell 100 by using the updated correction table.

In the process of step S29, detection signals that deviate significantly from the values of the other detection signals may be excluded from the target of averaging. Accordingly, the influence of noise can be suppressed, and the value of the detection signal after averaging can be made closer to the true value.

The averaging process in step S29 may be performed in the correction calculation part 205. In this case, the table storage part 204 stores the variation of the detection signal from each pixel cell 100 calculated by the variation calculation at each time, as a correction table. That is, in this case, a plurality of correction tables are stored in the table storage part 204. At the time of normal operation, the correction calculation part 205 refers to the plurality of correction tables, calculates the average value of the variations of the detection signal of each pixel cell 100, and corrects the detection signal from each pixel cell 100 on the basis of the calculated average value.

According to Modification 1, since the variation of the detection signal from each pixel cell 100 is corrected on the basis of the variations at a plurality of times, deviation of the value of the variation to be used for correction from the true value due to noise or the like can be suppressed. Therefore, the detection signal from each pixel cell 100 can be more appropriately made uniform.

Modification 2 of Embodiment 1

In Embodiment 1 described above, the table storage part 204 is disposed in the signal processing part 25. On the other hand, in Modification 2, the table storage part 204 is disposed within a sensor chip 400 of the solid-state imaging element 23.

Figure 10:
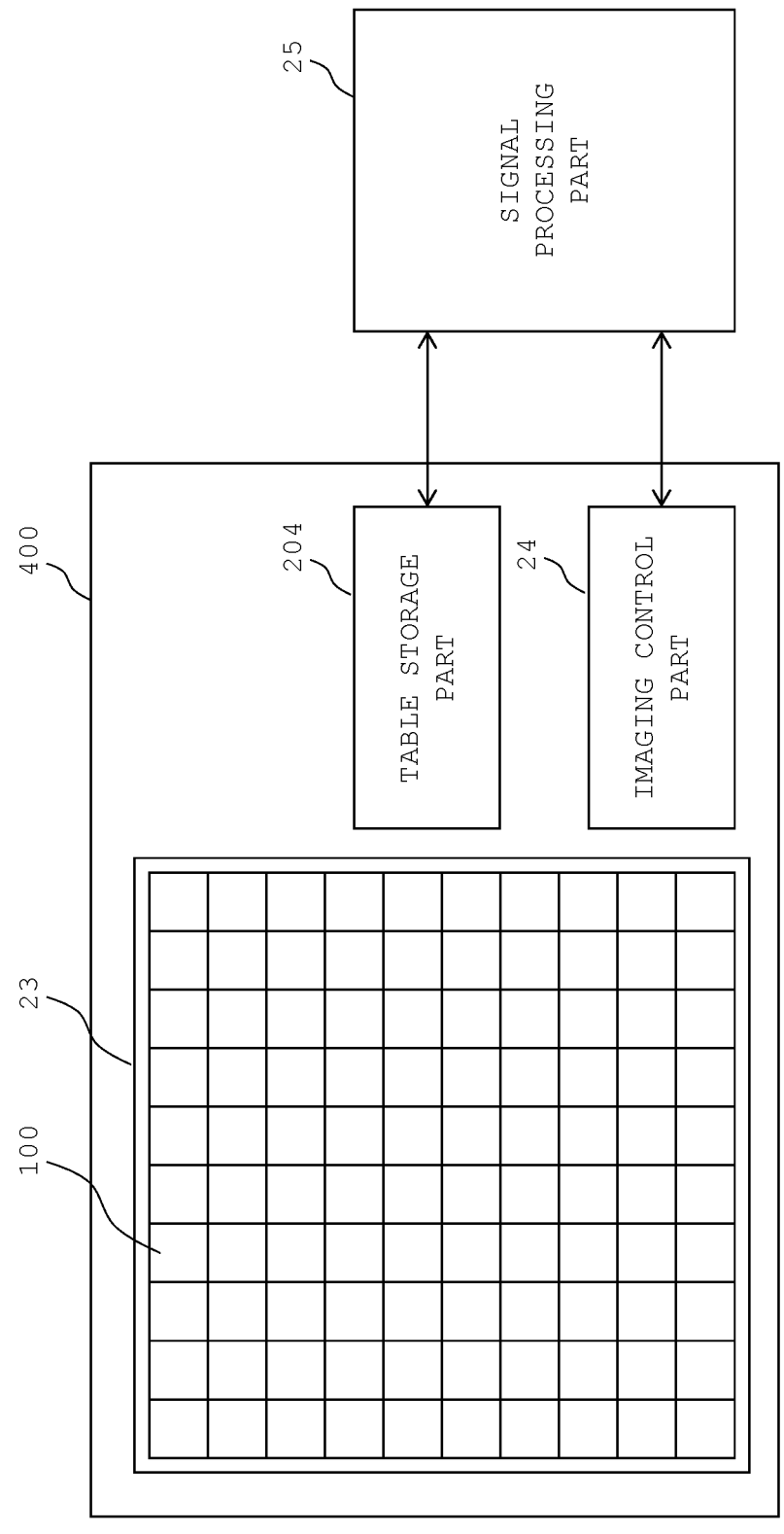
FIG. 10 is a diagram schematically showing a configuration of a sensor chip according to Modification 2.

FIG. 10 is a diagram schematically showing a configuration of the sensor chip 400 according to Modification 2.

As shown in FIG. 10, in addition to the solid-state imaging element 23, the imaging control part 24 and the table storage part 204 are provided in the sensor chip 400 as components of a circuitry (integrated circuit). In this configuration, the table storage part 204 and the imaging control part 24 are connected to the signal processing part 25 via terminals (not shown) disposed at the outer periphery of the sensor chip 400.

According to this configuration, for example, the initial value of the variation of a detection signal acquired at the time of manufacturing can be stored in advance in the table storage part 204 on the sensor chip 400 side. The variation calculation part 203 and the correction calculation part 205 may be further disposed on the sensor chip 400 side.

Embodiment 2>

In Embodiment 1 described above, electric charges accumulated in the floating diffusion part 110 through one time of an operation sequence are converted into a voltage, and the voltage is outputted to the vertical signal line Vsig. On the other hand, in Embodiment 2, electric charges accumulated in the floating diffusion part 110 through a plurality of times of an operation sequence are accumulated in a memory part, then the electric charges in the memory part are converted into a voltage, and the voltage is outputted to the vertical signal line Vsig. That is, in Embodiment 2, the number of times reflected light (photons) is incident on the APD 101 in a plurality of times of an operation sequence is counted as the amount of the electric charges accumulated in the memory part. The amount of the electric charges accumulated in the memory part is an electric charge amount corresponding to the number of times reflected light (photons) is incident on the APD 101.

Figure 11:
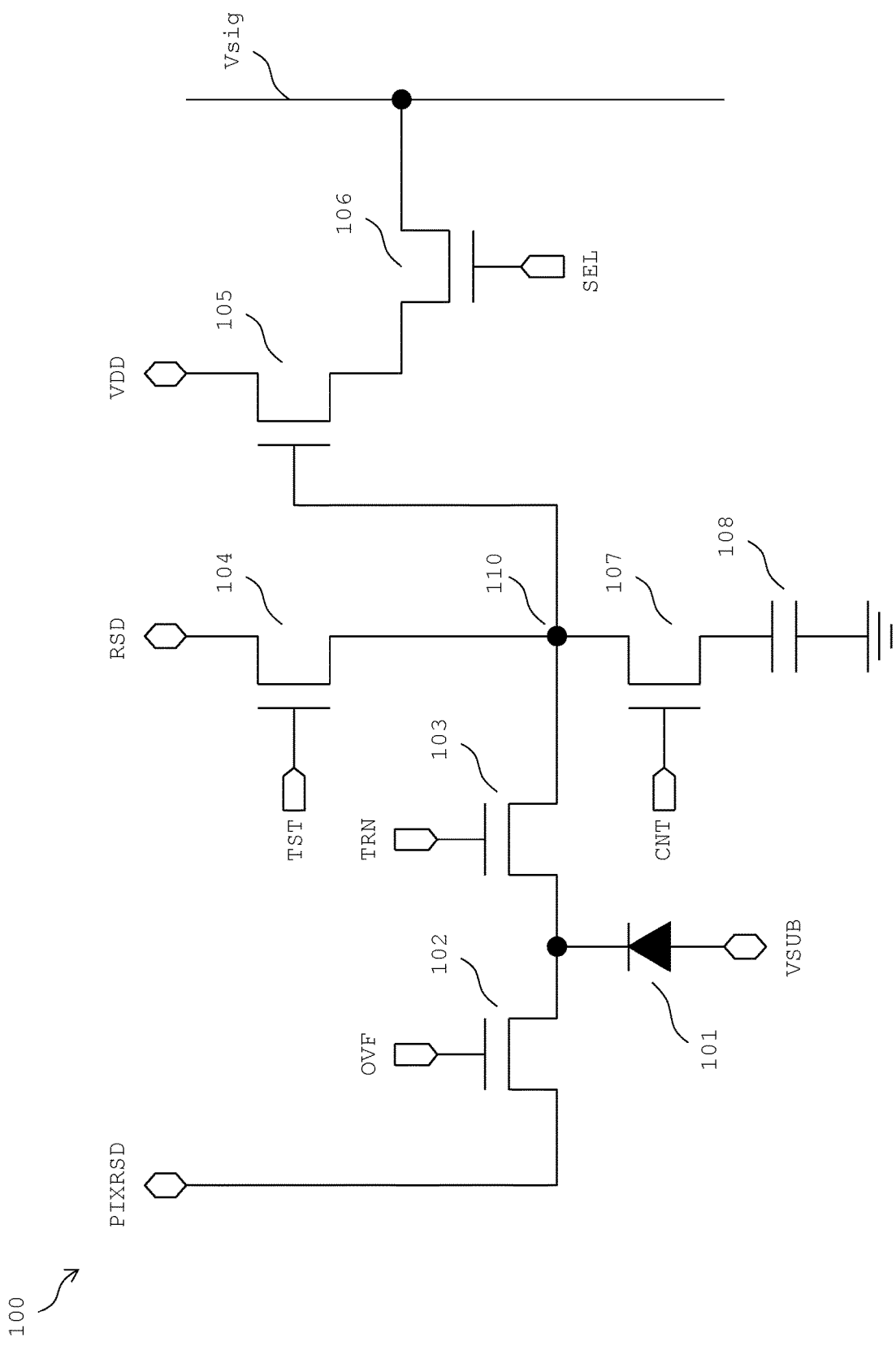
FIG. 11 is a diagram showing a configuration of a pixel cell according to Embodiment 2.

FIG. 11 is a diagram showing a configuration of a pixel cell 100 according to Embodiment 2.

In Embodiment 2, a count transistor 107 and a memory part 108 are added to the configuration of FIG. 2. The memory part 108 is a capacitor that accumulates electric charges. The count transistor 107 connects the floating diffusion part 110 and the memory part 108. By applying a count signal CNT to the gate of the count transistor 107, electric charges accumulated in the floating diffusion part 110 are transferred to the memory part 108 via the count transistor 107.

The capacity of the memory part 108 is larger than the capacity of the floating diffusion part 110. For example, the capacity of the memory part 108 is set to be about 5 times the capacity of the floating diffusion part 110. However, the method for setting the capacity of the memory part 108 is not limited thereto, and various setting methods may be applied.

FIG. 12A to FIG. 12D and FIG. 13A to FIG. 13D are each a diagram illustrating an operation sequence of the pixel cell 100.

FIG. 12A to FIG. 12D and FIG. 13A to FIG. 13D each show a potential diagram of a circuitry from the reset drain power source PIXRSD in FIG. 11 through the APD reset transistor 102, the transfer transistor 103, the floating diffusion part 110, and the count transistor 107 to the memory part 108. On the vertical axis, the direction of an arrow is the direction of low potential.

Similar to FIG. 3A to FIG. 3D, in FIG. 12A to FIG. 12D and FIG. 13A to FIG. 13D, "PIXRSD", "APD", and "FD" indicate the potential of the reset drain power source PIXRSD, the potential of the cathode of the APD 101, and the potential of the floating diffusion part 110, respectively. Moreover, similar to FIG. 3A to FIG. 3D, "OVF" and "TRN" indicate the potential of the APD reset transistor 102 and the potential of the transfer transistor 103, respectively. In addition, "MEM" indicates the potential of the memory part 108, and "CNT" indicates the potential of the count transistor 107.

In Embodiment 2 as well, in each operation sequence, after the initialization step of FIG. 4A is performed, the steps of FIG. 3A to FIG. 3D are executed, and electric charges are accumulated in the floating diffusion part 110. As described above in Embodiment 1, control in which the leveling-off step is performed simultaneously with the transfer step may be performed, or control in which the leveling-off step and the transfer step are performed simultaneously with the accumulation step may be performed.

Figure 12C:
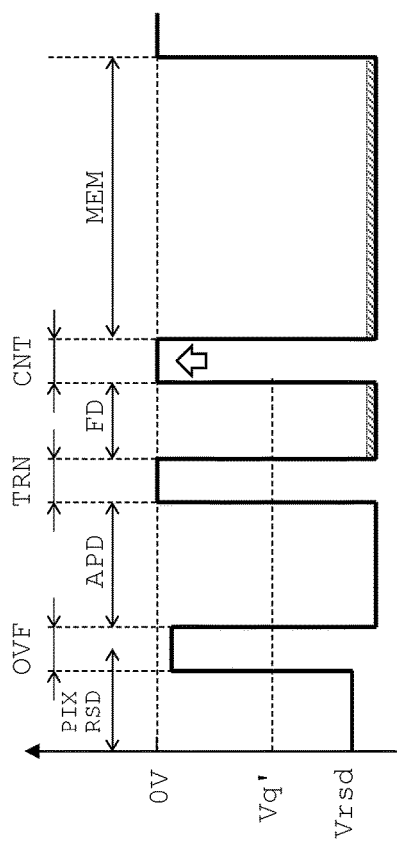
FIG. 12A to FIG. 12D are each a diagram illustrating an operation sequence of the pixel cell according to Embodiment 2.
Figure 12D:
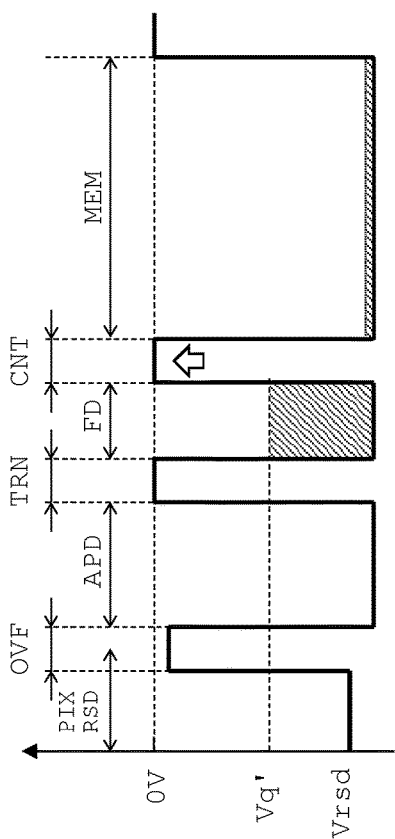
Figure 12A:
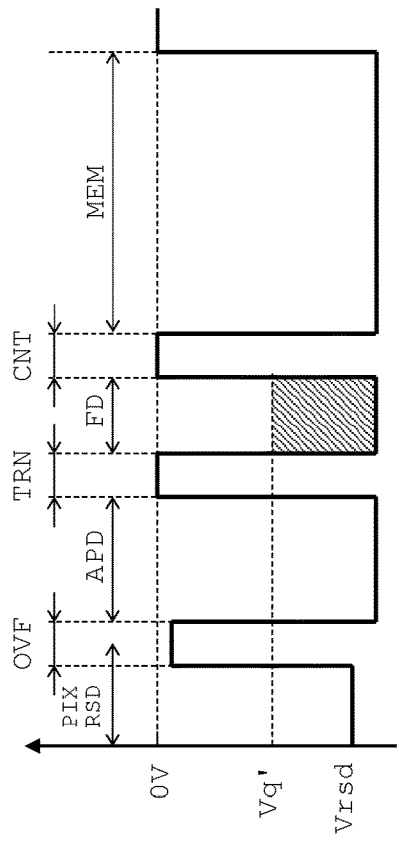

FIG. 12A shows a state where the FD reset transistor 104 is set to be OFF after the leveling-off step of FIG. 3D is performed. At this time, the count transistor 107 is set to be OFF, and a potential barrier is generated at the CNT.

Figure 12B:
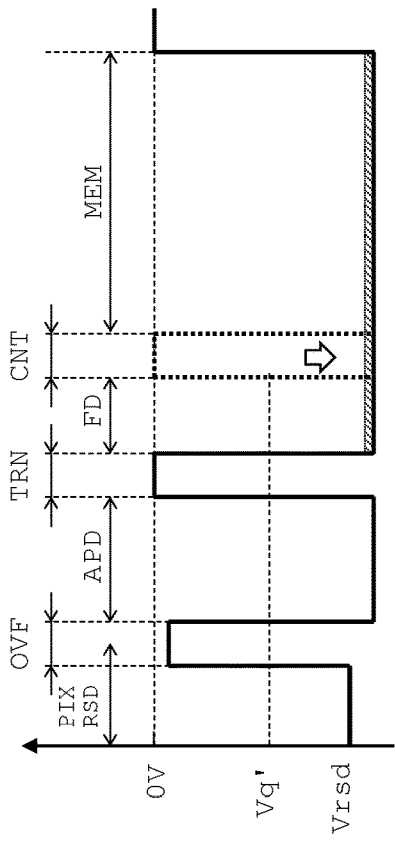

Thereafter, the imaging control part 24 sets the count transistor 107 to be ON. Accordingly, as shown in FIG. 12B, the potential barrier of the CNT disappears, and the electric charges accumulated in the floating diffusion part 110 are distributed to the memory part 108. After the distribution (transfer) of the electric charges to the memory part 108 is performed as described above, the imaging control part 24 sets the count transistor 107 to be OFF. Accordingly, as shown in FIG. 12C, a potential barrier is generated at the CNT, and the amount of the electric charges accumulated in the memory part 108 is determined to be an electric charge amount corresponding to one time of photon incidence.

When one sequence for accumulating electric charges in the memory part 108 ends as such, the imaging control part 24 executes the next sequence. Accordingly, the operation of FIG. 3A to FIG. 3D is executed. At this time, if reflected light (photons) is incident on the APD 101, the amount of electric charges corresponding to the reference accumulation potential Vq' is accumulated in the floating diffusion part 110 as shown in FIG. 12D.

Similar to the above, the imaging control part 24 sets the count transistor 107 to be ON. Accordingly, as shown in FIG. 13A, the potential barrier of the CNT disappears, and the electric charges accumulated in the floating diffusion part 110 are distributed to the memory part 108. As a result, the amount of the electric charges accumulated in the memory part 108 increases by the amount of electric charges corresponding to one photon count. Then, the imaging control part 24 sets the count transistor 107 to be OFF. Accordingly, as shown in FIG. 13B, a potential barrier is generated at the CNT, and the amount of the electric charges accumulated in the memory part 108 is determined to be the electric charge amount corresponding to two times of photon incidence.

The imaging control part 24 repeats the same sequence a predetermined number of times. Accordingly, in each sequence, each time reflected light (photons) is incident on the APD 101, the amount of electric charges corresponding to one photon count is accumulated in the memory part 108. When the predetermined number of times of sequence ends as such, for example, an amount of electric charges shown in FIG. 13C is accumulated in the memory part 108.

Thereafter, the imaging control part 24 sets the count transistor 107 to be ON. Accordingly, as shown in FIG. 13D, the potential barrier of the CNT disappears, and the electric charges accumulated in the memory part 108 are distributed to the floating diffusion part 110. Then, the imaging control part 24 sets the selection transistor 106 to be ON. Accordingly, a voltage corresponding to the electric charges accumulated in the memory part 108 is outputted as a detection signal to the vertical signal line Vsig. The detection signal has a magnitude corresponding to the number of times reflected light (photons) is incident on the APD 101.

Figure 14B:
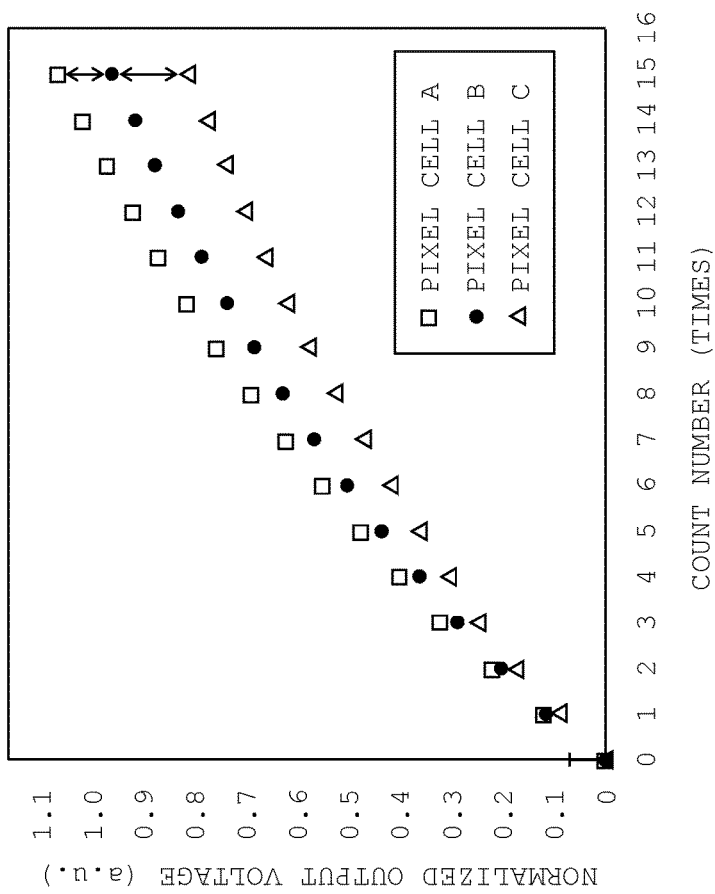
FIG. 14B is a graph showing an example of the relationship between a photon count number and an output voltage in the pixel cell according to Embodiment 2
Figure 14A:
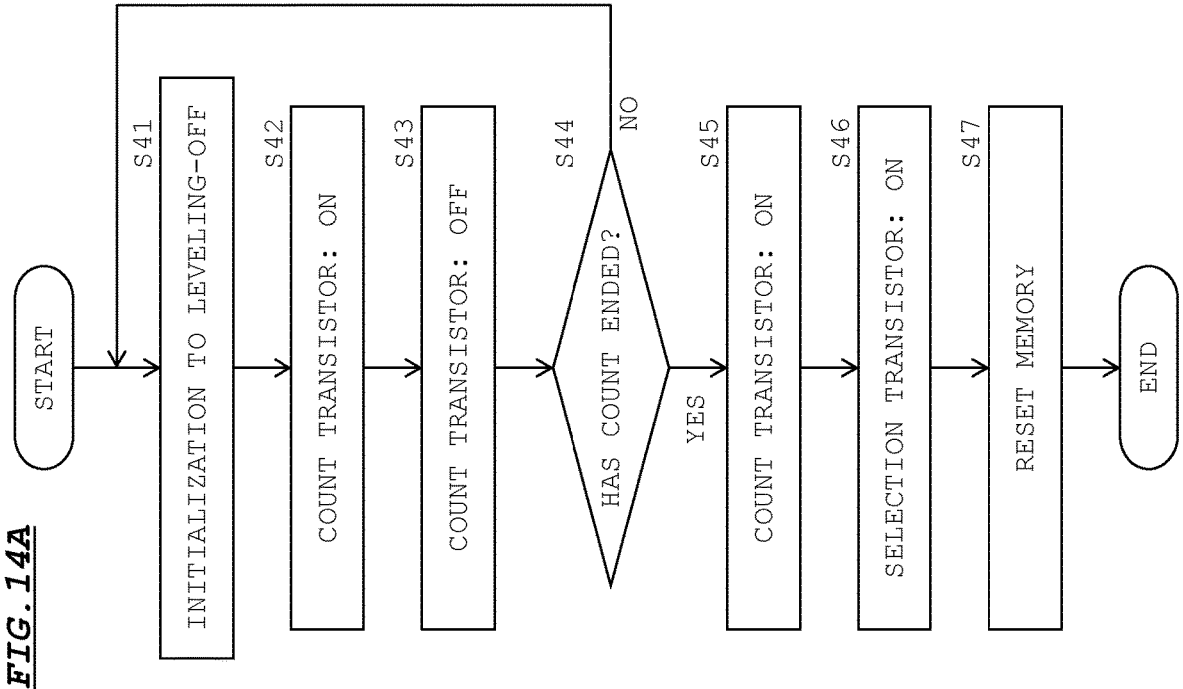
FIG. 14A is a flowchart for executing the operation sequence of the pixel cell according to Embodiment 2.

FIG. 14A is a flowchart for executing the above process.

The imaging control part 24 performs a step from initialization to leveling-off on the pixel cell 100 (S41). In this step, if reflected light (photons) is incident on the APD 101, the amount of electric charges corresponding to one photon count is accumulated in the floating diffusion part 110 as shown in FIG. 12A.

Next, the imaging control part 24 sets the count transistor 107 to be ON (S42). Accordingly, as shown in FIG. 12B, the electric charges accumulated in the floating diffusion part 110 are distributed to the memory part 108. Then, the imaging control part 24 sets the count transistor 107 to be OFF (S43). Accordingly, as shown in FIG. 12C, the electric charges distributed to the memory part 108 are determined.

Thereafter, the imaging control part 24 repeats the sequence of steps S41 to S43 a predetermined number of times (S44). When this number of times of the sequence ends (S44: YES), the imaging control part 24 sets the count transistor 107 to be ON (S45). Accordingly, the electric charges accumulated in the memory part 108 are distributed to the floating diffusion part 110. Then, the imaging control part 24 sets the selection transistor 106 to be ON for a predetermined time, and causes a voltage corresponding to the amount of the electric charges in the floating diffusion part 110, to be outputted to the vertical signal line Vsig (S46).

After the detection signal of the voltage value corresponding to the photon count number is outputted to the vertical signal line Vsig as described above, the imaging control part 24 sets the FD reset transistor 104 to be ON, and the electric charges accumulated in the floating diffusion part 110 and the memory part 108 are discharged to the reset drain power source RSD (S47). Accordingly, one sequence for photon counting ends. Then, the imaging control part 24 returns the process to S41 and repeats the same process.

The configuration of Embodiment 2 is suitable, for example, for the case where the imaging device 20 is mounted on a measurement device that irradiates a target region with light to measure the reflectance of the target region. In this case, if the reflectance of an object existing in the target region is low, for example, reflected light (photons) is incident on the APD 101 only a few times out of 10 times of pulsed light emission. That is, the photon count number (voltage corresponding to the amount of the electric charges accumulated in the memory part 108) obtained in each pixel cell 100 can correspond to the reflectance of the object. Therefore, the measurement device can measure the reflectance at the position, on the target region, corresponding to each pixel cell 100, on the basis of the detection signal of each pixel cell 100 inputted from the imaging device 20, that is, the voltage corresponding to the photon count number (voltage corresponding to the amount of the electric charges accumulated in the memory part 108). Accordingly, the measurement device can generate an image in which the reflectance is mapped at the position, corresponding to each pixel cell 100, on the target region.

However, in the detection signal (voltage corresponding to the photon count number) outputted from each pixel cell 100 to the imaging control part 24, a variation may occur for each pixel cell 100. That is, in step S41 of FIG. 14A, even when the electric charges in the floating diffusion part 110 are made uniform by the leveling-off step and then accumulated in the memory part 108, the amount of the electric charges accumulated in the memory part 108 in the sequence at each time may be varied for each pixel cell 100 due to the characteristics of the circuitry and the like. For example, in the leveling-off step, the level of the potential barrier of the RST may be slightly varied for each pixel cell 100 due to the electrical characteristics of the FD reset transistor 104 and the like.

In this case, due to accumulation of these slight variations in the memory part 108, even if the same photons are counted in each pixel cell 100, a large difference in the amount of electric charges accumulated in the memory part 108 occurs between these pixel cells 100. Accordingly, a variation occurs in the detection signal (voltage corresponding to the photon count number) outputted from each pixel cell 100.

FIG. 14B is a graph showing an example of the relationship between a photon count number and an output voltage in the pixel cell 100. Here, for convenience, a graph for three pixel cells A, B, and C is shown.

As shown in FIG. 14B, as the photon count number increases, the difference in output voltage (detection signal) between the pixel cells A, B, and C increases. When the count number reaches 15 times, the difference in output voltage (detection signal) between the pixel cells A, B, and C becomes considerably large as shown by arrows in FIG. 14B. When a difference occurs in the output voltage as described above, this results in that the count numbers are different from each other even though the output voltage is the same. Therefore, it is difficult to accurately acquire a photon count number on the basis of the output voltage.

Therefore, in Embodiment 2, the signal processing part 25 is provided with a configuration for properly acquiring a photon count number from a detection signal even when the detection signal (voltage corresponding to the photon count number) is varied for each pixel cell 100 as described above.

Figure 15:
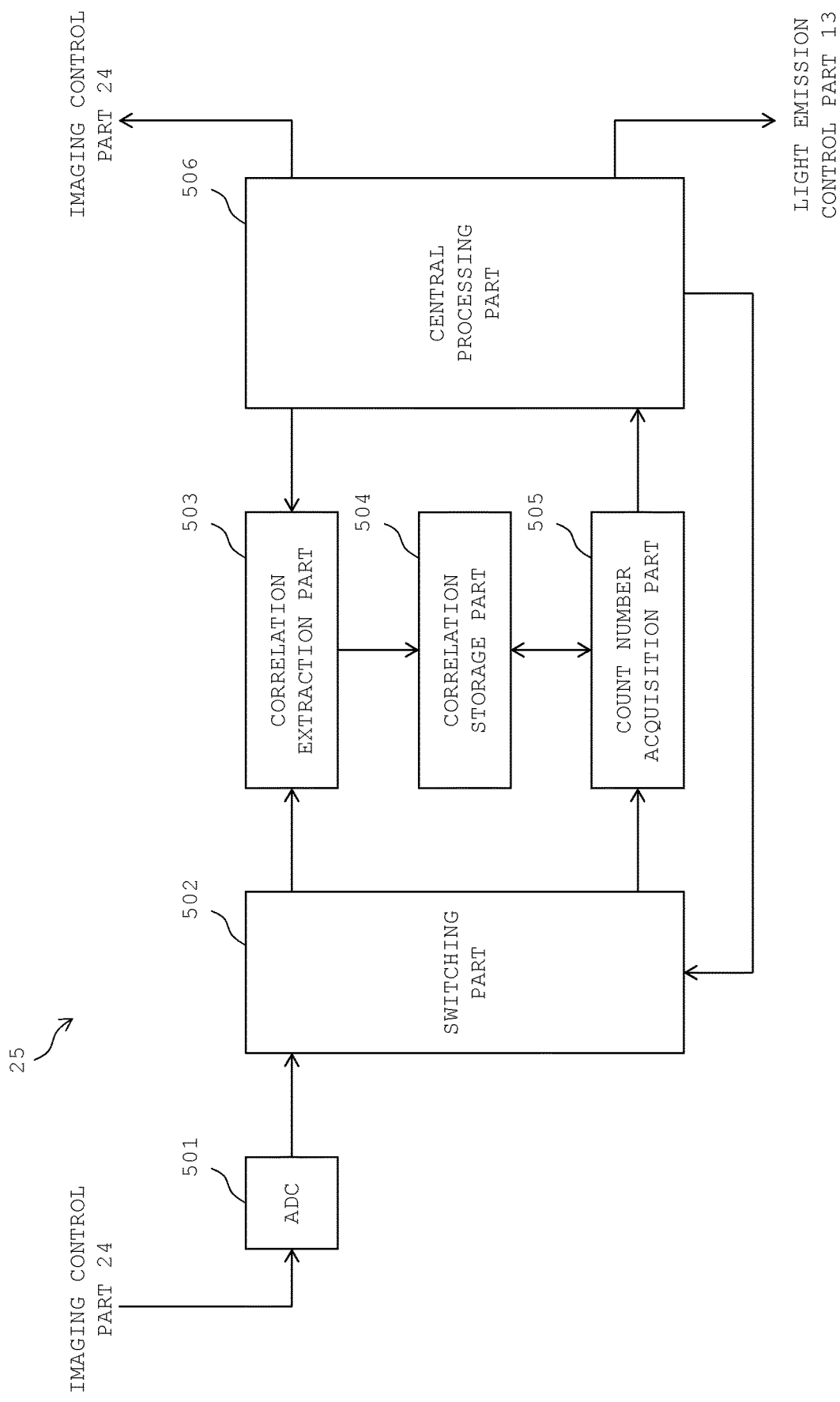
FIG. 15 is a diagram showing a configuration of a signal processing part according to Embodiment 2.

FIG. 15 is a diagram showing a configuration of the signal processing part 25 according to Embodiment 2.

The signal processing part 25 includes an ADC 501, a switching part 502, a correlation extraction part 503, a correlation storage part 504, a count number acquisition part 505, and a central processing part 506.

The ADC 501 converts the analog detection signal (voltage corresponding to the photon count number) of each pixel cell 100 inputted from the imaging control part 24, into a digital signal. The switching part 502 outputs the digital detection signal inputted from the ADC 501, to either the correlation extraction part 503 or the count number acquisition part 505 on the basis of control by the central processing part 206.

The correlation extraction part 503 extracts the correlation between the photon count number and the detection signal (voltage corresponding to the electric charges accumulated in the memory part 108) for each pixel cell 100. The correlation storage part 504 stores the correlation extracted by the correlation extraction part 503, for each pixel cell 100. The count number acquisition part 505 acquires the count number corresponding to the detection signal outputted from each pixel cell 100, on the basis of the correlation stored in the correlation storage part 504, and outputs the acquired count number to the central processing part 506.

The configuration shown in FIG. 15 may be realized by a function of software, or may be realized by a combination of hardware. In the case where the configuration shown in FIG. 15 is realized by a function of software, each component of FIG. 15 is one shown as a function block for each function executed by the software. In addition, in the case where the configuration shown in FIG. 15 is realized by a function of hardware, each component of FIG. 15 corresponds to the configuration of each hardware. The configuration of FIG. 15 may be realized by a combination of a function by software and hardware.

At the time of normal operation, the central processing part 506 sets the switching part 502 to the count number acquisition part 505 side. Accordingly, the detection signal inputted from the ADC 501 to the switching part 502 is inputted to the count number acquisition part 505. In this case, the count number acquired by the count number acquisition part 505 on the basis of the detection signal and the correlation stored in the correlation storage part 504 is inputted to the central processing part 506 and used for a process such as reflectance measurement.

At the time of operation of updating the correlation, the central processing part 506 sets the switching part 502 to the correlation extraction part 503 side. Accordingly, the detection signal inputted from the ADC 501 to the switching part 502 is inputted to the correlation extraction part 503. In this case, the correlation extracted by the correlation extraction part 503 is stored in the correlation storage part 504 for each pixel cell 100. Here, a correlation table in which the count number and the detection signal are associated with each other is stored in the correlation storage part 504 for each pixel cell 100. Accordingly, the correlation between the count number and the detection signal is updated.

Figure 16B:
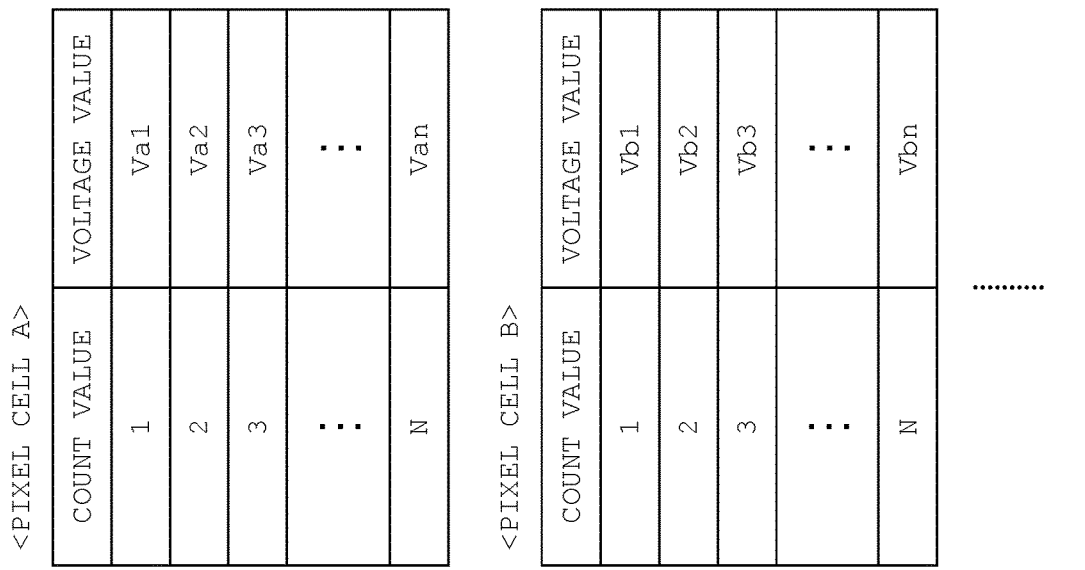
FIG. 16B is a diagram showing a configuration of a correlation table according to Embodiment 2.
Figure 16A:
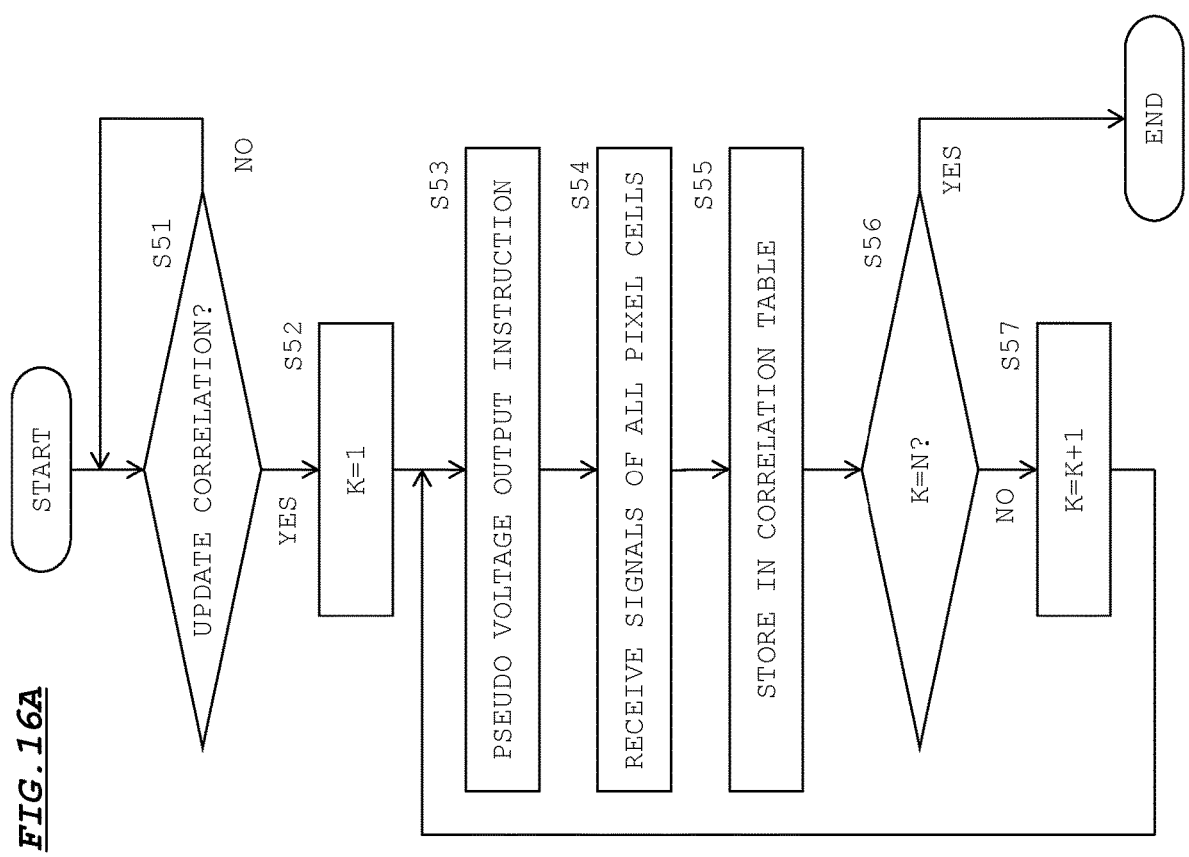
FIG. 16A is a flowchart showing a process executed by the signal processing part at the time of operation of updating a correlation according to Embodiment 2.

FIG. 16A is a flowchart showing a process executed by the signal processing part 25 at the time of operation of updating the correlation.

First, the central processing part 206 determines whether or not an update condition for the correlation is satisfied (S51). This determination is performed, for example, in the same manner as in the flowchart of FIG. 7. Similar to Embodiment 1 described above, the update condition is not limited to the conditions in steps S31 to S34 of FIG. 7.

When the update condition for the correlation is satisfied (S51: YES), the central processing part 206 sets 1 as a variable K (S52) and transmits a pseudo voltage output instruction to the imaging control part 24 (S53). The pseudo voltage output instruction is an instruction to cause electric charges whose amount is equal to an electric charge amount when the count number is K times, to be accumulated in the memory part 108 in a pseudo manner, and cause a detection signal (voltage) corresponding to this amount of the electric charges, to be outputted from the pixel cell 100 in a pseudo manner.

In response to this, the imaging control part 24 executes a pseudo accumulation step of causing electric charges whose amount is equal to the electric charge amount when the count number is K times, to be accumulated in the memory part 108 of FIG. 11 in a pseudo manner, and a pseudo output step of causing a voltage corresponding to the accumulated electric charges to be outputted to the vertical signal line Vsig.

For example, in the pseudo accumulation step, the imaging control part 24 controls the reset drain power source PIXRSD and the APD reset transistor 102 of FIG. 11 to execute a process of causing electric charges whose amount is equal to the saturated electric charge amount, to be accumulated in the cathode of the APD 101, and further executes a step of transferring the accumulated electric charges to the floating diffusion part 110 and a step of leveling-off the transferred electric charges to the electric charge amount corresponding to the reference accumulation potential Vq'. Then, the imaging control part 24 executes the steps of FIG. 12A to FIG. 12C to transfer the electric charges accumulated in the floating diffusion part 110 in a pseudo manner to the memory part 108. In the pseudo accumulation step, the imaging control part 24 repeats the above steps K times. Accordingly, electric charges whose amount is equivalent to the electric charge amount when the photon count number is K times are accumulated in the memory part 108.

The control executed by the imaging control part 24 in the pseudo accumulation step is not limited to the above control, and may be other control in which at least electric charges whose amount is equivalent to the electric charge amount when the photon count number is K times can be accumulated in the memory part 108.

For example, in the pseudo accumulation step, the imaging control part 24 may perform control of setting the reset drain power source RSD shown in FIG. 11 to have a potential equal to the reference accumulation potential Vq' and setting the FD reset transistor 104 to be ON. Accordingly, electric charges whose amount corresponds to a potential equal to the reference accumulation potential Vq' are accumulated in the floating diffusion part 110. Thereafter, after the leveling-off step is executed, the imaging control part 24 causes the electric charges in the floating diffusion part 110 to be transferred to the memory part 108. In the pseudo accumulation step, the imaging control part 24 repeats the above steps K times. Accordingly, electric charges whose amount is equivalent to the electric charge amount when the photon count number is K times are accumulated in the memory part 108.

Alternatively, in the pseudo accumulation step, the imaging control part 24 may perform control of setting the reset drain power source RSD shown in FIG. 11 to have a potential of an electric charge amount equivalent to that when the photon count number is K times, and setting the FD reset transistor 104 and the count transistor 107 to be ON. Accordingly, electric charges whose amount is equivalent to the electric charge amount when the photon count number is K times are accumulated in the memory part 108.

Similar to the case of FIG. 6B, pseudo accumulation of electric charges in the floating diffusion part 110 may be performed optically.

After the pseudo accumulation step is executed as described above, the imaging control part 24 executes a pseudo output step of causing a voltage corresponding to the electric charges accumulated in the memory part 108 in a pseudo manner to be outputted to the vertical signal line Vsig. Specifically, the imaging control part 24 sets the count transistor 107 of FIG. 11 to be ON to transfer the electric charges accumulated in the memory part 108 to the floating diffusion part 110, and then sets the selection transistor 106 to be ON for a predetermined time to output a voltage (pseudo detection signal) corresponding to the amount of the electric charges accumulated in the floating diffusion part 110 to the vertical signal line Vsig.

In accordance with reception of the pseudo voltage output instruction, the imaging control part 24 executes the above pseudo accumulation step and pseudo output step in order on all the pixel cells 100. Accordingly, a pseudo detection signal from each pixel cell 100 is sequentially outputted from the imaging control part 24 to the signal processing part 25. At this time, the switching part 502 of FIG. 15 is set to the correlation extraction part 503 side as described above. Therefore, the pseudo detection signal from each pixel cell 100 is sequentially calculated by the correlation extraction part 503. In this manner, the correlation extraction part 503 acquires the detection signals of all the pixel cells 100 (S54).

The correlation extraction part 503 stores the voltage value of the detection signal of each pixel cell 100 in the correlation table held in the correlation storage part 504, in association with the count value (the same value as the variable K) (S55).

FIG. 16B is a diagram showing a configuration of the correlation table.

The correlation table is prepared for each pixel cell 100. The correlation table is a table in which a count value and a voltage value are associated with each other. In step S55, the correlation extraction part 503 outputs the voltage value of the detection signal of each pixel cell 100 to the correlation storage part 504. The correlation storage part 504 stores the inputted voltage value of each pixel cell 100 in the correlation table for the corresponding pixel cell 100 in association with the count value (the same value as the variable K).

When the storage has been performed on the correlation table as described above, the central processing part 506 determines whether or not the variable K has reached a set number of times N (S56). Here, the set number of times N is a preset upper limit of the count value. That is, the upper limit of the range for counting photons is the set number of times N. When the variable K has not reached the set number of times N (S56: NO), the central processing part 506 adds 1 to the variable K (S57) and returns the process to step S53. Accordingly, a detection signal (voltage) corresponding to the count value increased by 1 is acquired for each pixel cell 100 by the processes of steps S53 and S54, and the voltage value of the acquired detection signal is stored in the correlation table in step S55.

In this manner, the voltage values when the count value is 1 to N are stored in the correlation table for each pixel cell 100. Accordingly, when the determination of step S56 becomes YES, the central processing part 506 ends the process of updating the correlation table.

Since the correlation between the count value and the detection signal from each pixel cell 100 is extracted by performing the process of FIG. 16A, the leveling-off step of FIG. 3D does not necessarily have to be performed in the process of updating the correlation table and normal operation. However, by performing the leveling-off step of FIG. 3D to suppress the variation of the detection signal (voltage) with respect to each count value, the correlation can be more accurately extracted.

Effects of Embodiment 2

According to Embodiment 2, the following effects can be achieved.

By executing the process of updating the correlation in advance, the correlation (correlation table) between the count number of photons received by the APD 101 and the detection signal of the pixel cell 100 is extracted and stored in the correlation storage part 504. Then, at the time of normal operation, the count number corresponding to the detection signal from each pixel cell 100 is acquired by the count number acquisition part 505 on the basis of this correlation (correlation table). Accordingly, even when a variation occurs in the detection signal from each pixel cell 100, the photon count number can be properly acquired without providing a feedback circuit.

The correlation extraction part 503 stores a correlation table that defines the correlation between a count number and a detection signal, in the correlation storage part 504 for each pixel. Accordingly, the count number acquisition part 505 only has to read the count number corresponding to the detection signal (voltage value) from each pixel cell 100 inputted at the time of normal operation, from the correlation table, and can smoothly acquire the count number by a simple process.

As described with reference to FIG. 16A, when electric charges corresponding to each count number are accumulated in the memory part 108 of each pixel cell 100 in a pseudo manner, the correlation extraction part 503 sets a correlation table on the basis of the detection signal outputted from each pixel cell 100. More specifically, as shown in FIG. 16B, when electric charges corresponding to each count number are accumulated in the memory part 108 of each pixel cell 100, the value (voltage value) of the detection signal outputted from each pixel cell 100 is registered in the correlation table in association with this count number. The correlation table can be smoothly updated at a desired timing by using the pseudo accumulation process for setting the update table as described above.

Modification 1 of Embodiment 2

In Embodiment 2 described above, in the process of updating the correlation table, the detection signal (voltage value) outputted from each pixel cell 100 is registered in the correlation table as it is. On the other hand, in Modification 1, a plurality of types of correlation tables in each of which a count value and a voltage value are associated with each other are prepared in advance. Then, of the plurality of types of correlation tables, a correlation table that best matches the correlation between the count value and the detection signal (voltage value) outputted from each pixel cell 100 in the process of updating the correlation table is set in the correlation table used for this pixel cell 100.

FIG. 17A is a flowchart showing a process executed by the signal processing part 25 at the time of operation of updating the correlation according to Modification 1 of Embodiment 2.

In the flowchart of FIG. 17A, step S55 of the flowchart of FIG. 16A is replaced with step S58, and step S59 is newly added. The processes of the other steps are the same as the processes of the corresponding steps of FIG. 16A.

In step S58, the correlation extraction part 503 stores the voltage value of the detection signal from each pixel cell 100 in the correlation storage part 504 in association with the count number (the same value as the variable K). By repeating the processes of steps S53 to S57 until the variable K reaches the set number of times N, all the count numbers and the voltage values are stored for the pixel cell 100 in the correlation storage part 504 in association with each other.

When the variable K has thus reached the set number of times N (S56: YES), the correlation extraction part 503 compares a data group of the count numbers and the voltage values of each pixel cell 100 stored in the correlation storage part 504 as a result of the processes of steps S53 to S57 with the plurality of types of correlation tables stored in advance in the correlation storage part 504, and sets a correlation table that best matches the data group of each pixel cell 100, as a correlation table to be used for each pixel cell 100 (S59). Here, the determination of matching is performed, for example, by a method in which the difference between the voltage value on the data group side and the voltage value on the correlation table side is obtained for each count number and a correlation table in which the total value of these differences is the smallest is determined as a best matching correlation table. However, the method of the determination of matching is not limited thereto, and another determination method may be used.

The correlation extraction part 503 stores identification information of the correlation table set for each pixel cell 100 as described above, in the correlation storage part 504 in association with the pixel cell 100. Thereafter, the correlation storage part 504 deletes the data group stored as a result of the processes of steps S53 to S57.

FIG. 17B is a diagram showing information stored in the correlation storage part 504 in step S59 of FIG. 17A.

As shown in FIG. 17B, the identification information of the correlation table used for each pixel cell 100 is stored in the correlation storage part 504 in association with each pixel cell 100. At the time of normal operation, in the count number acquisition part 505, the correspondence table of FIG. 17B is referred to, and the correlation table used for each pixel cell 100 is specified. Similar to Embodiment 2 described above, the count number acquisition part 505 acquires the count number corresponding to the detection signal (voltage value) for each pixel cell 100 by using the specified correlation table, and outputs the acquired count number to the central processing part 506.

According to this configuration, it is not necessary to individually create and store correlation tables for all the pixel cells 100, so that the consumption of the storage capacity of the correlation storage part 504 at the time of normal operation can be suppressed. That is, at the time of normal operation, the correlation storage part 504 only has to store the plurality of types of preset correlation tables and the identification information of the correlation table associated with each pixel cell 100. Therefore, the consumption of the capacity of the correlation storage part 504 can be significantly suppressed as compared with Embodiment 2 described above.

As the correlation table stored in advance in the correlation storage part 504, a pattern that can correspond to the variation of the detection signal (voltage value) that may occur in each pixel cell 100 may be prepared. For example, about ten types of correlation tables can be prepared.

Modification 2 of Embodiment 2

In Embodiment 2 described above, the correlation between the detection signal and the count number is defined by a correlation table. On the other hand, in Modification 2, the correlation between the detection signal and the count number is defined by a correlation function.

Figure 18A:
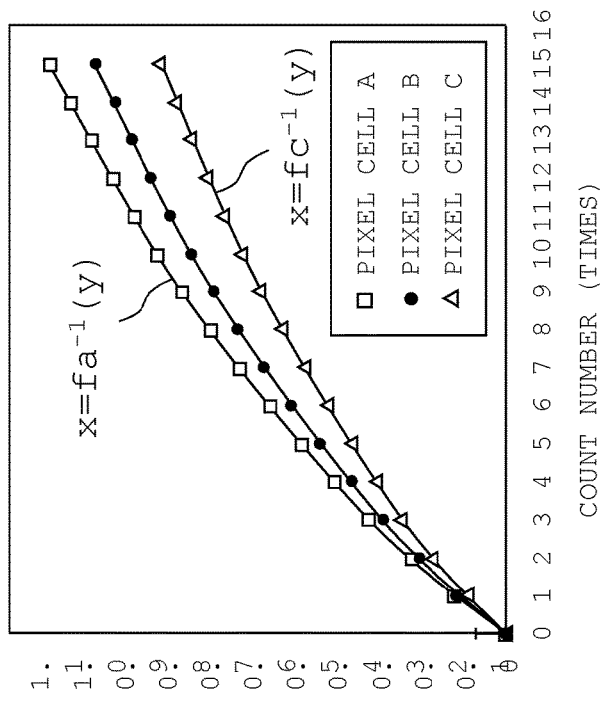
FIG. 18A is a flowchart showing a process executed by a signal processing part at the time of operation of updating a correlation according to Modification 2 of Embodiment 2.

FIG. 18A is a flowchart showing a process executed by the signal processing part 25 at the time of operation of updating the correlation according to Modification 2 of Embodiment 2.

In the flowchart of FIG. 18A, step S59 of the flowchart of FIG. 17A according to Modification 1 of Embodiment 2 described above is replaced with step S60. The processes of the other steps are the same as the processes of the corresponding steps of FIG. 17A.

When the processes of steps S53, S54, S58, and S57 are repeated N times and the determination of step S56 becomes YES, all the count numbers and the voltage values are stored in the correlation storage part 504 in association with each other for each pixel cell 100 as described above.

Thereafter, on the basis of the data group of the count numbers and the voltage values of each pixel cell 100 stored in the correlation storage part 504 as a result of the processes of steps S53 to S57, the correlation extraction part 503 generates a correlation function that defines the correlation between a count number and a voltage value, for each pixel cell 100 (S60). The correlation extraction part 503 holds an algorithm for generating the correlation function.

The correlation extraction part 503 stores the correlation function set for each pixel cell 100 as described above, in the correlation storage part 504 in association with the pixel cell 100. The correlation extraction part 503 may store a basic correlation function and a correlation coefficient that is set for each pixel cell 100. Thereafter, the correlation storage part 504 deletes the data group stored as a result of the processes of steps S53 to S57.

Figure 18B:
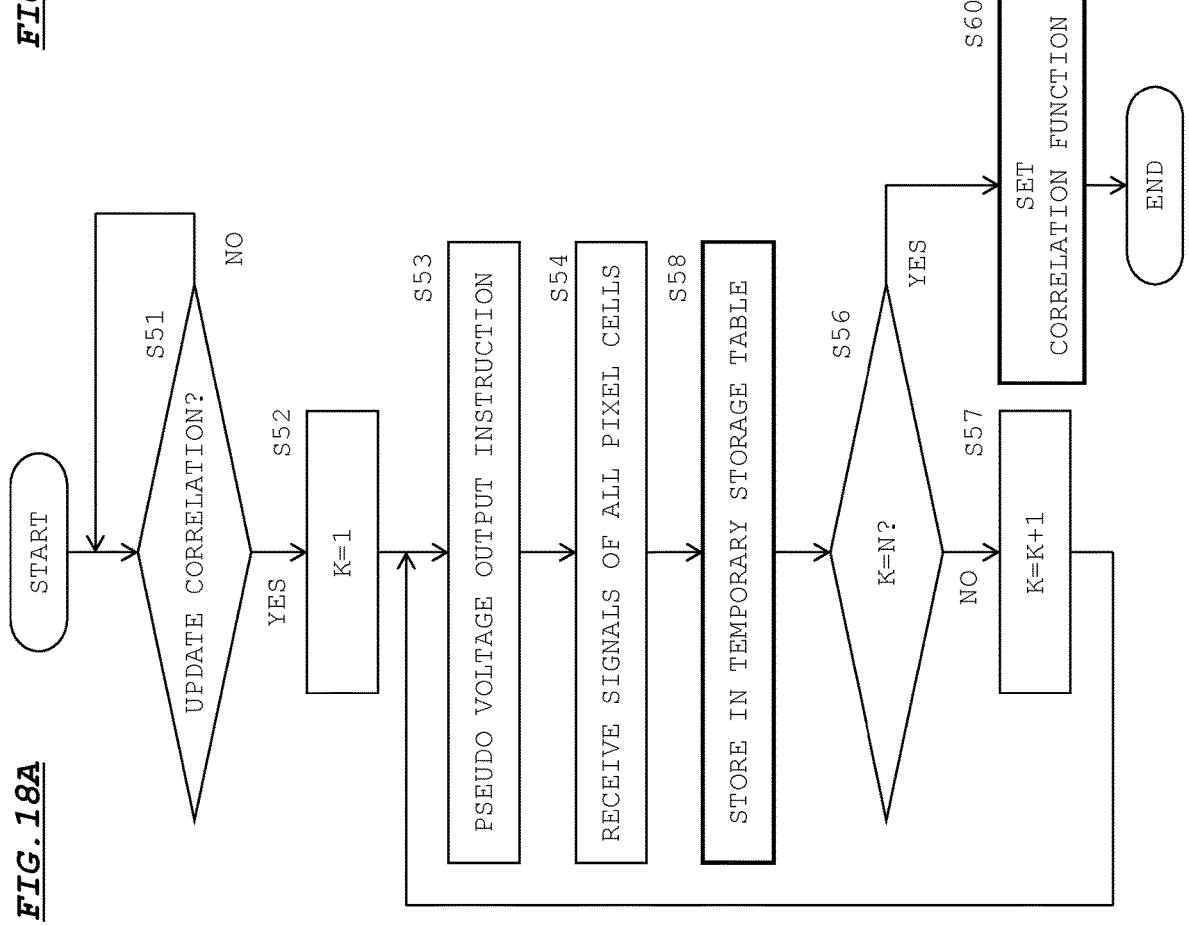
FIG. 18B is a diagram schematically showing a correlation function stored in a correlation storage part by the process of FIG. 18A, according to Modification 2 of Embodiment 2.

FIG. 18B is a diagram schematically showing a correlation function stored in the correlation storage part 504 in step S60 of FIG. 18A. Here, for convenience, correlation functions for three pixel cells A, B, and C are shown.

In FIG. 18B, the count number on the horizontal axis is set as a variable x. In order to obtain the count number x from an output voltage y, each correlation function is shown as an inverse function. At the time of normal operation, the correlation function for each pixel cell 100 shown in FIG. 18B is specified in the count number acquisition part 505. The count number acquisition part 505 calculates a count number corresponding to a detection signal (voltage value) for each pixel cell 100 by using the specified correlation function, and outputs the calculated count number to the central processing part 506.

According to this configuration, the correlation function for each pixel cell 100 only has to be stored in the correlation storage part 504, so that the consumption of the memory capacity of the correlation storage part 504 at the time of normal operation can be significantly suppressed as compared with Embodiment 2 described above.

In step S60 of FIG. 18A, a correlation function is generated for each pixel cell 100. However, instead of this, a plurality of types of correlation functions may be prepared in advance, and a process of associating a correlation function that best matches the correlation between the detection signal and the count number in each pixel cell 100, with each pixel cell 100, may be performed in step S60.

Embodiment 3

In Embodiment 2 described above, the imaging device 20 is used in a device for measuring the reflectance of an object, but in Embodiment 3, the imaging device 20 is used in a distance measurement device. An overall picture of a distance measurement device 2 in which the imaging device 20 described above in Embodiment 2 is used will be described.

Figure 19:
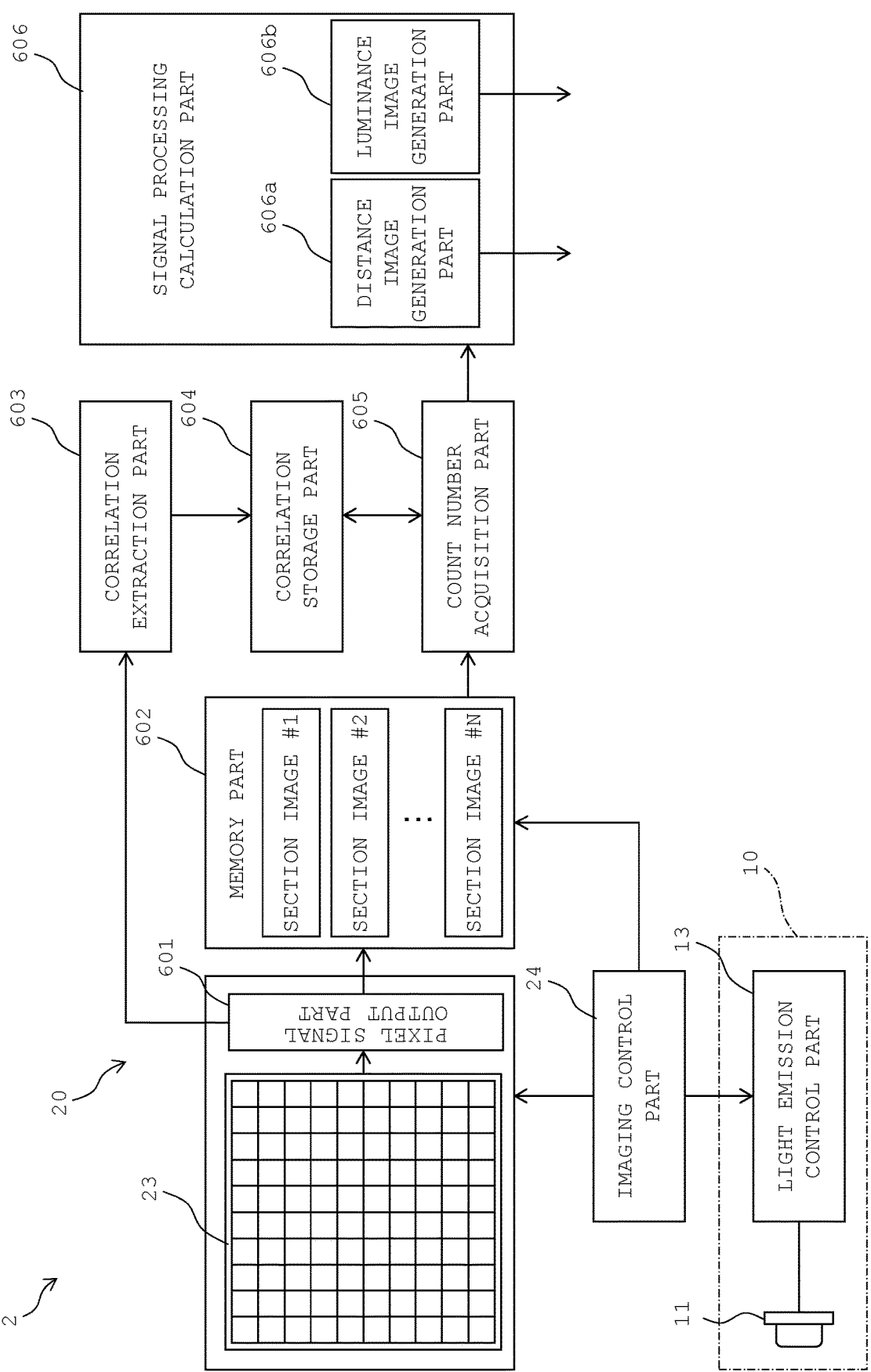
FIG. 19 is a block diagram showing a configuration of a distance measurement device according to Embodiment 3.

FIG. 19 is a block diagram showing a configuration of the distance measurement device 2 according to Embodiment 3.

In the configuration of FIG. 19, the configuration blocks other than a light-emitting device 10 correspond to the imaging device 20.

In Embodiment 3, the imaging control part 24 controls the light projecting device 10. The imaging control part 24 controls the light emission control part 13 to cause the light source 11 to emit light in a pulsed manner, and controls the solid-state imaging element 23 to output a detection signal from each pixel cell 100. A pixel signal output part 601 performs a process such as amplification, noise removal, and A/D conversion on the detection signal outputted from each pixel cell 100 to the vertical signal line Vsig, and outputs the resultant signal.

Similar to Embodiment 2 described above and the modifications thereof, a correlation extraction part 603 acquires the correlation between the count value and the detection signal (voltage value) outputted from each pixel cell 100, and stores the acquired correlation in a correlation storage part 604. Similar to Embodiment 2 described above and the modifications thereof, a count number acquisition part 605 converts the detection signal (voltage value) outputted from each pixel cell 100, into a count value on the basis of the correlation stored in the correlation storage part 604.

A signal processing calculation part 606 generates a distance image and a luminance image on the basis of the count value of each pixel cell 100 inputted from the count number acquisition part 605. The generated distance image and luminance image are outputted to another information processing device as appropriate.

Hereinafter, a process of generating a distance image and a luminance image in the distance measurement device 2 of FIG. 19 will be described.

By repeating a set of pulsed light emission and exposure N (N is an integer of 3 or more) times, the imaging control part 24 takes N section images corresponding to N (N is an integer of 3 or more) section distances into which a distance measurement range is divided. Here, the distance measurement range is the entire distance range where measurement is possible from the distance measurement device 2 to a subject. For example, the distance measurement range is set to 0 to Dmax (m). The N section distances are partial distance ranges obtained by dividing the distance measurement range into N equal sections. The N section distances are not limited to the N equal sections, and may be partial distance ranges obtained by unevenly dividing the distance measurement range. For example, depending on the measurement target and the measurement environment of the distance measurement device 2, the N section distances may be defined so as to include a section distance that is a small distance range and a section distance that is a large distance range.

The imaging control part 24 controls the light source 11 and the solid-state imaging element 23 so as to take N section images by supplying a light emission control signal to the light emission control part 13 and supplying an exposure control signal to the solid-state imaging element 23. Specifically, the imaging control part 24 controls the light source 11 and the solid-state imaging element 23 by generating a light emission control signal and an exposure control signal such that N sets of emission pulses and exposure pulses are generated per distance image for one frame.

The imaging control part 24 generates an exposure pulse such that the time difference between a light emission timing and an exposure timing gradually increases in a first measurement period (Tm1) to an Nth measurement period (TmN). The time difference between the light emission timing and the exposure timing corresponds to the distance (distance range) to a subject that causes reflected light received by the solid-state imaging element 23 in the measurement period. That is, when reflected light is received in the measurement period, the distance from the distance measurement device 2 to the subject corresponds to the time difference.

That is, the imaging control part 24 generates an exposure pulse indicating exposure in a section of a time slot Tsk in the measurement period Tmk. Here, k is an integer from 1 to N.

For example, the imaging control part 24 generates an exposure pulse indicating exposure in a section of a time slot Ts1 in the first measurement period Tm1. The solid-state imaging element 23 generates an image by the exposure in the time slot Ts1 as a section image #1, and holds the image in a memory. For example, in the case where a period of each time slot is assumed to be 10 nS, the solid-state imaging element 23 can receive reflected light that appears within 10 nS from the start of the pulsed light emission, in the time slot Ts1, but cannot receive reflected light that appears after the time slot Ts1. That is, from the following expression (1), in the time slot Ts1, the solid-state imaging element 23 can receive reflected light from a subject that is present in a distance range of section distance #1=0 to 1.5 m, and cannot receive reflected light from a subject that is present outside the section distance #1.

$$2 \times L1 < 10\ nS \times c \tag{1}$$

Here, c indicates the speed of light ($3 \times 10^8$ m/s). L1 indicates the distance range of the section distance #1. $2 \times L1$ is the reciprocating distance of the irradiation light.

As described above, when reflected light from a subject is received in the first measurement period Tm1, it means that the subject is at a distance within the range of the section distance #1 (for example, 0 to 1.5 m).

Similarly, the imaging control part 24 generates an exposure pulse indicating exposure in the section of the time slot Tsk in the kth measurement period Tmk. The solid-state imaging element 23 generates an image by the exposure in the time slot Tsk as a section image #k. For example, in the case where a period of each time slot is 10 nS, in the kth measurement period Tmk, the solid-state imaging element 23 can receive reflected light that appears in the section of the time slot Tsk, but cannot receive reflected light that appears outside this section. That is, from the following expression (2), in the kth measurement period Tmk, the solid-state imaging element 23 can receive reflected light from a subject that is present in a distance range Lk= (distance range from $(k-1) \times 1.5$ m to $k \times 1.5$ m), and cannot receive reflected light from a subject that is present at a distance outside this distance range Lk.

$$(k-1) \times 10\ nS \times c < 2 \times Lk < k \times 10\ nS \times c \tag{2}$$

Here, $2 \times Lk$ is the reciprocating distance of the irradiation light.

As described above, when reflected light from a subject is received in the kth measurement period Tmk, it means that the subject is at a distance within the section distance #k (for example, the distance range from $(k-1) \times 1.5$ m to $k \times 1.5$ m).

Here, in order to acquire one section image, the imaging control part 24 continuously repeats light emission and exposure a plurality of times (for example, 10 times). That is, the imaging control part 24 continuously executes the process in the kth measurement period a plurality of times to accumulate electric charges in the memory part 108 shown in FIG. 11. After the electric charges are accumulated in the memory part 108 as described above, a voltage value corresponding to the electric charges in the memory part 108 is outputted as a detection signal to the vertical signal line Vsig as described above in Embodiment 2. Accordingly, a section image #k corresponding to the kth measurement period is acquired. Thereafter, the imaging control part 24 continuously executes a process in the next k+1th measurement period a plurality of times to acquire a section image #k+1 corresponding to the k+1th measurement period. The imaging control part 24 stores the sequentially acquired section images in a memory part 602.

After the N section images thus obtained are stored in the memory part 602, the signal value (voltage value) of the detection signal mapped to each pixel position of each section image is converted by the count number acquisition part 605 into a count number based on the correlation held in the correlation storage part 604. The count number acquisition part 605 outputs the count number obtained as a result of the conversion to the signal processing calculation part 606. Accordingly, in the signal processing calculation part 606, a count image in which the count number is mapped to each pixel position is acquired for each section image.

The signal processing calculation part 606 generates a distance image and a luminance image on the basis of the acquired count image for each section image. The distance image is generated by the function of a distance image generation part 606a of the signal processing calculation part 606. In addition, the luminance image is generated by the function of a luminance image generation part 606b of the signal processing calculation part 606.

The distance image generation part 606a compares the count value of each pixel mapped in each count image with a predetermined threshold, and adds a predetermined color to a pixel having a count value equal to or higher than the threshold. Here, the distance image generation part 606a sets a different color for each count image. For example, in the case of a count image #1 acquired from a distance image #1 at a section distance #1, blue is added to a pixel having a count value exceeding the threshold, and in the case of a count image #2 acquired from a distance image #2 at a section distance #2, light blue is added to a pixel having a count value exceeding the threshold. Accordingly, an image having a different color added for each distance is acquired for each image. The distance image generation part 606a combines the thus acquired images for all the count images into an image for one frame. Accordingly, a distance image for one frame is generated. The distance image generation part 606a outputs the generated distance image to an external information processing device or the like.

The luminance image generation part 606b sets a luminance value corresponding to the magnitude of the count value of each pixel, for each pixel with respect to a count image acquired in the same manner as described above, and generates a luminance image per count image. The luminance image generation part 606b outputs each generated luminance image to the external information processing device or the like. The luminance image generation part 606b may combine all the luminance images to generate a luminance image for one frame, and may output the generated luminance image for one frame to the external information processing device or the like.

Other Modifications

Although Embodiments 1 to 3 of the present invention and the modifications thereof have been described above, the present invention is not limited to Embodiments 1 to 3 described above and the modifications thereof, and various modifications can also be made to embodiments of the present invention other than Embodiments 1 to 3 described above and the modifications thereof.

For example, also, in Embodiment 2, the imaging control part 24 and the correlation storage part 504 may be mounted on the sensor chip 400 as shown in FIG. 10.

Also, in Embodiment 2, similar to the modification of Embodiment 1 shown in FIG. 9, a data group of a detection signal (voltage value) and a count value is acquired a plurality of times for the same pixel cell 100, and a value obtained by averaging a plurality of the acquired detection signals (voltage values) for each count value may be registered in a correlation table.

The potential and capacity of each part shown in FIG. 3A to FIG. 3D, FIG. 4A, FIG. 4B, FIG. 12A to FIG. 12D, FIG. 13A, and FIG. 13B are merely examples, and may be changed as appropriate to other potential and capacity.

The configuration of the imaging device 20 is not limited to the configuration shown in FIG. 1, and various modifications can be made thereto. For example, the filter 22 may be omitted when it is not necessary to receive only light having a predetermined wavelength. The configuration of the signal processing part 25 can also be modified as appropriate.

The imaging control part 24 can also be controlled with a higher degree of freedom on the basis of a control signal from the outside of a chip.

Each processing part included in the solid-state imaging device 1 is typically realized as an LSI which is an integrated circuit. These processing parts may be individually formed on one chip, or some or all of the processing parts may be integrated on one chip. Moreover, the integrated circuit implementation is not limited to the LSI, but may be achieved by a dedicated circuit or a general-purpose processor. A field programmable gate array (FPGA) which is programmable after production of an LSI, and a reconfigurable processor in which the connection and the setting of circuit cells within the LSI are reconfigurable, may be used.

At least some of the functions of the solid-state imaging devices according to Embodiments 1 to 3 described above and the modifications thereof may be combined.

The example in which MOS transistors are used is shown in the above description, but other transistors may be used.

The imaging device 20 is mounted on the distance measurement device 1 in Embodiment 1 described above, the imaging device 20 is used in the reflectance measurement device in Embodiment 2, and the imaging device 20 is used in the distance measurement device 2 in Embodiment 3, but the application form of the imaging device 20 is not limited thereto. For example, the present invention may be applied to an imaging device used in fields such as medical treatment and radiation measurement.

In addition to the above, various modifications can be made as appropriate to the embodiments of the present invention, without departing from the scope of the technological idea defined by the claims.

What is claimed is:
1. An imaging device comprising:
   a solid-state imaging element having a plurality of pixel cells arranged in a matrix; and
   a signal processing part configured to process a detection signal outputted from each of the pixel cells, wherein the pixel cells each include an avalanche photodiode and output a voltage corresponding to a count number of photons received by the avalanche photodiode as the detection signal, and the signal processing part includes
- a variation calculation part configured to calculate a variation between the pixel cells in the detection signal outputted from each of the pixel cells, and
- a correction calculation part configured to correct the detection signal outputted from each of the pixel cells, on the basis of the variation calculated by the variation calculation part.

2. The imaging device according to claim 1, wherein the variation calculation part acquires a reference value for determining the detection signals, corresponding to the count numbers of photons, outputted from all the pixel cells, and calculates the variation with respect to each pixel cell on the basis of a difference between the reference value and the detection signal of each of the pixel cells.

3. The imaging device according to claim 2, wherein the reference value is determined by any one of a mode, a median value, or an average value when the detection signals outputted from all the pixel cells are made into a histogram.

4. The imaging device according to claim 2, wherein
the signal processing part further includes a table storage part configured to store the difference between the reference value and the detection signal for each pixel cell, and
the correction calculation part adds the difference to the detection signal for each pixel cell to correct the detection signal.

5. The imaging device according to claim 1, wherein when electric charges are accumulated in a pseudo manner by electrical control on the plurality of pixel cells, the variation calculation part calculates the variation on the basis of the detection signal outputted from each of the pixel cells.

6. The imaging device according to claim 1, wherein when electric charges are accumulated in a pseudo manner by irradiating the plurality of pixel cells with light, the variation calculation part calculates the variation on the basis of the detection signal outputted from each of the pixel cells.

7. The imaging device according to claim 1, wherein
the variation calculation part calculates the variation a plurality of times at different timings, and
the correction calculation part corrects the variation with respect to the detection signal from each of the pixel cells on the basis of the variations calculated the plurality of times.

8. The imaging device according to claim 1, wherein when a predetermined update condition is satisfied, the variation calculation part calculates the variation and updates the variation in each of the pixel cells.

9. An imaging device comprising:
- a solid-state imaging element having a plurality of pixel cells arranged in a matrix; and
- a signal processing part configured to process a detection signal outputted from each of the pixel cells, wherein
the pixel cells each include an avalanche photodiode,
during an exposure period of the pixel cells, the pixel cells accumulate charges from the avalanche photodiode to output a voltage corresponding to the accumulated charges as the detection signal, wherein the accumulated charges correspond to a count number of photons received by the avalanche photodiode during the exposure period, and
the signal processing part includes
- a correlation extraction part configured to extract a correlation between the count number and the detection signal for each of the pixel cells, and
- a count number acquisition part configured to acquire the count number corresponding to the detection signal from each of the pixel cells on the basis of the correlation extracted by the correlation extraction part.

10. The imaging device according to claim 9, wherein the correlation extraction part sets a correlation table that defines a correlation between the count number and the detection signal, for each of the pixel cells.

11. The imaging device according to claim 10, wherein when electric charges corresponding to each count number are accumulated in the pixel cell in a pseudo manner, the correlation extraction part sets the correlation table on the basis of the detection signal outputted from each of the pixel cells.

12. The imaging device according to claim 11, wherein the correlation extraction part holds a plurality of types of the correlation tables in advance, and associates the correlation table of a correlation that is closest to a correlation between the count number and the detection signal outputted from each of the pixel cells, with each of the pixel cells.

13. The imaging device according to claim 9, wherein when electric charges corresponding to each count number are accumulated in the pixel cell in a pseudo manner, the correlation extraction part sets a correlation function that defines the correlation between the count number and the detection signal, for each of the pixel cells on the basis of the detection signal outputted from each of the pixel cells.

* * * * *